(12) United States Patent
Steels et al.

(10) Patent No.: US 7,707,147 B2
(45) Date of Patent: Apr. 27, 2010

(54) SELF-ORGANIZATION APPROACH TO SEMANTIC INTEROPERABILITY IN PEER-TO-PEER INFORMATION EXCHANGE

(75) Inventors: Luc Steels, Paris (FR); Peter Hanape, Paris (FR)

(73) Assignee: Sony France S.A., Clichy la Garenne (FR)

( * ) Notice: Subject to any disclaimer, the term of this patent is extended or adjusted under 35 U.S.C. 154(b) by 253 days.

(21) Appl. No.: 11/243,241

(22) Filed: Oct. 4, 2005

(65) Prior Publication Data

US 2006/0074906 A1 Apr. 6, 2006

(30) Foreign Application Priority Data

Oct. 5, 2004 (EP) .................................. 04292363

(51) Int. Cl.
- *G06F 7/00* (2006.01)
- *G06F 17/00* (2006.01)
- *G06F 17/30* (2006.01)

(52) U.S. Cl. ................ 707/5; 707/104.1; 707/E17.108; 707/E17.143

(58) Field of Classification Search ...................... 707/5, 707/6, 104.1, E17.108, E17.143; 706/12
See application file for complete search history.

(56) References Cited

U.S. PATENT DOCUMENTS

| | | | |
|---|---|---|---|
| 5,852,823 A * | 12/1998 | De Bonet | 707/6 |
| 6,556,983 B1 | 4/2003 | Altschuler et al. | |
| 6,598,042 B1 * | 7/2003 | Kienan | 707/3 |
| 6,751,600 B1 * | 6/2004 | Wolin | 706/12 |

FOREIGN PATENT DOCUMENTS

| | | |
|---|---|---|
| EP | 0 848 347 | 6/1998 |
| WO | WO 98/26368 | 6/1998 |

OTHER PUBLICATIONS

Bo Ling et al, "A Content-Based Resource Location Mechanism in PeerIS", Proc. of the 3rd int. conf. on web information systems engineering, Dec. 12, 2002, pp. 279-288.*
Paul Fergus et al, "Distributed Emergent Semantics in P2P Networks", Information and Knowledge Sharing, Nov. 17th-19th, 2003, pp. 75-82.*
Boujemaa, et al, "What's beyond query by example?", 2003.*
Bo Ling et al: "A content-based resource location mechanism in peerIS" Proc. of the $3^{rd}$ Int. Conf. on Web Information Systems Engineering, Dec. 12, 2002, pp. 279-288, XP010632801.

(Continued)

*Primary Examiner*—Yicun Wu
*Assistant Examiner*—Brannon W Smtih
(74) *Attorney, Agent, or Firm*—Oblon, Spivak, McClelland, Maier & Neustadt, L.L.P.

(57) ABSTRACT

In the exchange of information in a peer-to-peer information system network, the problem of semantic interoperability of the communication system used by the agent associated with every peer is addressed not by imposing a universal predefined ontology over universally defined conceptual schemata, but instead using mechanisms, inspired from natural language, that enable each agent to develop a repertoire of grounded categories and labels for these categories and to negotiate their use and semantics with other agents. The communication system, as well as its semantics, is hence emergent and adaptive instead of predefined.

9 Claims, 4 Drawing Sheets

1. Client owner chooses $G_c \subset D_c$ with $K_c$ as context
2. Client's IA categorizes $G_c$ as $cat_c$
3. Client's IA codes $cat_c$ as $l$ → $l$ →

1. Server IA decodes $l$ as $cat_s$
2. Server IA filters: $R = filter(D_s, cat_s)$

← $R$ ←

4. Client owner selects $F \subseteq R$ as relevant data

→ $F$ →

5. Client updates $D_c$ and $M'$ with $F$

3. Server updates $M'$ with $F$

OTHER PUBLICATIONS

Bellavista P et al: "Integrating mobile agent infrastructures with CORBA-based distributed multimedia applications" Feb. 7, 2001, pp. 121-128, XP010532115.

"The Semantic Web" by T. Berners-Lee and J. Hendler, Scientific American, May 2001.

"CYC, Wordnet and EDR-critiques and responses—discussion" by D. Lenat et al, Comm. of the ACM 38 (11), Nov. 1995, pp. 45-48 (available at http://www.acm.org/pubs/articles/journals/cacm/1995-38-11/p24-lenat/p45-lenat.pdf).

"A UUID URN Namespace" by Leach et al, The Internet Engineering Task Force, Internet drafts, http://www.ietf.org/internet-drafts/draft-mealling-uuid-urn-03.txt, (1998).

"Emergent Semantics through Interaction in Image Databases" by Simone Santini et al, IEEE Transactions on Knowledge and Data Engineering, vol. 13, pp. 337-351, (2001).

"RDF-based Peer-to-Peer Networks for Distributed (Learning) Repositories", by Wolfgang Nejdl et al, Technical Report, Nov. 2002.

"Emergent Semantic. Principles and Issues" by K. Aberer et al, Proceedings of the International Conference on Semantics of a Networked World, www.ipsi.fraunhofer.de/risse/pub/P2004-01.pdf, (2004).

"The Chatty Web: Emergent Semantics through Gossiping" by K. Aberer et al, in Proceedings of the 12$^{th}$ World Wide Web Conference, citeseer.ist.psu.edu/aberer03chatty.html, (2003).

"A Multi-Agent Approach for Peer-to-Peer based Information Retrieval System" by H. Zhang et al, in Proceedings of the Third International Joint Conference on Autonomous Agents and Multi-Agent Systems, AAMAS, Jul. 2004, pp. 456-464, New York.

"Mediators in the Architecture of Future Information Systems" by G. Wiederhold, IEEE "Computer", Mar. 1992, pp. 38-49.

"Semantic Interoperability in Peer-To-Peer Information Exchange through Emergent Semantics" Luc Steels et al., Sep. 1, 2004, pp. 1-16.

"Adaptive Querying to Knowledge Exchange" by Alessandro Agostini and Paolo Avesani, 3$^{rd}$ International Joint Conference on Autonomous Agents and Multiagent Systems (AAMAS-04), Jul. 19-23, 2004, New York, USA.

"The Origins of Ontologies and Communication Conventions in Multi-Agent Systems", Luc Steels, Autonomous Agents and Multi-Agent Systems, 1(2), 1998, pp. 169-194, Springer Verlag.

"A Peer to Peer Advertising Game" by Paolo Avesani and Alessandro Agostini, Proceedings of the First International Conference on Service Oriented Computing (ICSOC-03), pp. 28-42, Springer-Verlag, 2003.

"Emergent Semantics" by S. Staab, IEEE Intelligent Systems, pp. 78-86, 2002, www.cwi.nl/media/publications/nack-ieee-intsys-2002.pdf (includes a contribution by Luc Steels at p. 83-85).

"Ostensive Automatic Schema Mapping for Taxonomy-based Peer-to-Peer Systems" by Yannis Tzitzikas et al, Proceedings of the 7$^{th}$ International Workshop on Cooperative Information Agents, CIA '03, Helsinki, Finland, Aug. 2003.

"A Survey of Approaches to Automatic Schema Matching" by E. Rahm et al, VLDB Journal: Very Large Databases 10: 334350 http://citeseer.ist.psu.edu/rahm01survey.html, (2001).

"Evolving grounded communication for robots" by Luc Steels, Trends in Cognitive Science, vol. 7, Issue 7, Jul. 2003, pp. 308-312.

* cited by examiner

1. Client owner chooses $G_c \subset D_c$ with $K_c$ as context
2. Client's IA categorizes $G_c$ as $cat_c$
3. Client's IA codes $cat_c$ as $l$ → $l$ →

1. Server IA decodes $l$ as $cat_s$
    2. Server IA filters:
       $R = filter(D_s, cat_s)$

← $R$ ←

4. Client owner selects $F \subseteq R$ as relevant data

→ $F$ →

5. Client updates $D_c$ and $M'$ with $F$

3. Server updates $M'$ with $F$

SELF-ORGANIZATION APPROACH TO SEMANTIC INTEROPERABILITY IN PEER-TO-PEER INFORMATION EXCHANGE

CROSS REFERENCE TO RELATED PATENT DOCUMENTS

This patent application claims priority to the European Patent with the No. 04 292 363.1 with a filing date of Oct. 5, 2004, the contents thereof are herewith incorporated by reference.

The present invention relates to the field of information exchange in a peer-to-peer network. More particularly, the present invention relates to a method and system promoting semantic interoperability between peers exchanging information in a peer-to-peer network.

An information system contains a collection of data and, possibly, a set of meta-data structured according to some conceptual schema. In the present document the expression "meta-data" is used in a broad sense to include, amongst other things, data of a bibliographic nature—author, artist, date of creation, genre, country of origin, etc—which, in general, cannot be determined unless a prior information is available, as well as data descriptive of the associated content itself (which can be determined even in the absence of a priori knowledge)—for example:

for a song, this could include data on the song's tempo, pitch, percussivity, etc., for a movie, this could include data indicating whether the movies is set primarily indoors or outdoors, whether it involves urban landscape or natural landscape, etc., for documents, this could include keywords (capable of being determined by statistical analysis), etc., for images, this could include colour histograms, information indicating whether the image is a synthetic image or photograph, data stemming from object and shape detection/recognition in the image, etc., and so on for different types of content.

Both data and meta-data are open-ended in the sense that new data may be added or removed at any time. New meta-data may become accessible to the system from external sources, for example, tempo may be computed by signal processing algorithms that are available as a web service, etc.

To enable user interaction, an information system typically allows a user to taxonomically structure the data according to her own named categories so that she can retrieve items through use of these names. Typical examples of information systems are:

The 'favored' web pages of a user organised in bookmark folders. The data consists of the URLs to the web pages and the taxonomy is the hierarchy of named folders that the user can browse through to retrieve a web page. The taxonomy implicitly defines a categorisation of web pages by the user.

A set of music files maintained by a user, organised as a series of named hierarchical playlists.

A set of images organised according to specific interests of the user, e.g. a series of medical images organised along pathologies, or a series of paintings organised along periods, genres, and painters.

A set of scientific papers organised along specific research themes.

The human user, further called the owner of the information system, controls her information system by adding data and imposing structure on the data in the form of taxonomies and giving names to the nodes in the taxonomy. Note that the categorisations of the user implied by these taxonomies are based on private cognitive processes which are not accessible to other users nor to information systems. For example, a user may decide to put all the songs she likes in one folder and the ones she does not like in another. This categorization decision is completely subjective and can never be automated nor emulated by a machine.

The taxonomy created and maintained by the user shall be denoted here "the owner taxonomy". The names used in this taxonomy (which could be words or phrases) are owner names. The taxonomy implies a particular way of categorization (known perhaps even only at an intuitive level by the owner) which is called the user ontology, (see FIG. 1). The user ontology is implicitly implied in the taxonomy but otherwise not known. FIG. 1 also illustrates the case where the information system uses meta-data organized according to some particular conceptual schema.

A peer-to-peer information system consists of a collection of such information systems. Each information system is owned and maintained by a different user and assumed to operate independently of the others. Typically, each information system will be harboured on a computer system owned by a user, and the user can interact with the information system using some interface associated with application software running on the computer system (e.g. application software for browsing the information system's dataset).

The defining characteristic of peer-to-peer information systems is that they allow direct information exchange between peers without the need to go through a central server. Examples of peer-to-peer information systems are peer-to-peer music file sharing, such as Napster or Gnutella, that are already used by millions of people today. Similar sharing networks are growing for movies or game software. Also in the domain of scientific data or educational materials, there are growing networks of peer-to-peer shared systems.

In a peer-to-peer information system, the owner of one information system typically directly queries another information system in order to obtain additional data. The information system of the querying peer is called the client and the system providing information is called the server. For example:

A web user may want to query the bookmark folders of another user in order to find web pages that may be of interest.

A user may want to query the play lists of another user in order to find music that might be of interest to her.

A user may want to query the image database of another user in order to find images that relate to her own interests.

A user who is looking for papers that are relevant to one of the research topics she is investigating, might want to query the set of papers stored by another user.

In the spirit of peer-to-peer information systems, any node can behave as client or as server. Note that users communicate through the taxonomies with which each owner has organised her data.

Information exchange between peers is not restricted to clients emitting queries requesting data from servers. A user could emit an announcement telling other peers about the data in her own information system (for example, as an offer of data to them). Once again, the user would employ her own taxonomy when formulating the announcement.

There are two key problems in peer-to-peer information exchange. The first one is that the data and names used in the taxonomies of one peer (the client) are typically different from those used by another peer (the server) and so the client's owner cannot know how to formulate the query nor can the server's owner or the server itself know how to respond if the query is not formulated according to its (the server's) taxonomy. This is a real problem for users of currently operational peer-to-peer systems. For example, in a music-file-sharing network, users must try to guess the titles of data and the meaning of names given to the folders and subfolders.

The second problem is that the conceptual schemata used for storing data and meta-data in each information system may be very different, particularly if the meta-data is itself open-ended. Even a simple incompatibility, such as usage of different languages, can be a problem. For example, the client may have a meta-datum 'country(Belgium)' whereas the server may have 'pays(Belgique)'. Without semantic knowledge, information systems cannot know how the two meta-data map onto each other, and so a client cannot simply formulate a query for a server using his own meta-data.

Both problems are instances of the so called "semantic interoperability" problem.

One solution to semantic interoperability is to standardize. The different users of a peer-to-peer network could all agree a priori to use the same taxonomies to structure their data and to use the same conceptual schemata for their data and meta-data. The owner names in the taxonomies can then act as a shared communication protocol between peers. For example, all users could agree to use the taxonomies of Yahoo for organising their data, and adopt the names used by Yahoo (possibly with translations into different languages).

Unfortunately such a standardization approach is unlikely to work for a truely open-ended peer-to-peer network in volatile domains like music file sharing, medical images or scientific papers. As new topics and new kinds of data come up all the time, styles shift, and interests of users diverge. There are legacy systems which should also be enabled to participate in a peer-to-peer network. It is very hard to capture all this once and for all in a static ontology.

Alternatively, it is possible that each peer has its own local taxonomy, and its own conceptual schema but that these are translated into a global ontology and conceptual schema which is used for querying and information exchange and thus exacts as an Interlingua between peers. The translations could be based on defining as much as possible the semantics of the names in the taxonomies. For example, if a user has a sub-folder in his music file system with songs by the Beatles, then the semantics of the implied category is translated in a query over meta-data: 'performed-by(TheBeatles)'. This query can then be used (possibly after translation by a mediator) into a query over the meta-data of a peer.

This is the approach currently being explored by the Semantic Web initiative with regard to web information systems (see "The Semantic Web" by T. Berners-Lee and J. Hendler, Scientific American, May 2001), and, more generally, by "universal" ontologies such as those advocated by CYC or Wordnet (see "CYC, Wordnet and EDR—critiques and responses—discussion" by D. Lenat et al, Comm. of the ACM 38 (11), November 1995, pp. 45-48 at http://www.acm.org/pubs/articles/journals/cacm/1995-38-11/p24-lenat/p45-lenat.pdf). It has lead to extensive efforts to develop common ontologies, support systems for defining these ontologies, ways for mapping local schemas into global schemas, and mechanisms to use ontologies in information retrieval, i.e. for mapping categories to data. However a consensus is growing that this approach has several major drawbacks:

The semantic web which relies on universal ontologies just pushes the problem of semantic interoperability to another level. It still requires standardisation based on universal ontologies. It is hard to imagine that a world-wide consensus is reachable and enforcable in every domain of human activity for which information systems are currently in use. Even in restricted domains this is hard because of an increasingly interconnected global world.

Human activity and the information systems built for them are open systems. They cannot be defined once and for all but must be adapted to new needs.

Peer-to-peer information systems are distributed systems. There is no central control point and so it is not possible to control them centrally.

Many information systems already exist and ways should be found to enable their participation in peer-to-peer networks.

The present inventors have adopted an alternative approach to semantic interoperability, whereby information systems are extended with components so that peers can develop and negotiate their own communications protocols in interaction with the data world and the world of human users. In this way, the agents autonomously create an Interlingua which they can each locally interpret. Just as in human natural languages, the consensus will be for ever emergent, adaptive and local.

The approach used by the present invention can be designated SASI (Self-organisation Approach to Semantic Interoperability); it employs techniques drawn from recent work on language games for robot-robot and robot-human communication (see WO98/26368) but expands and changes these techniques to make them applicable to the current task.

According to the present invention, semantic interoperability is seen as a coordination problem between the world, information systems, and human users. A particular kind of 'semiotic dynamics' is defined so that both the labels used in peer-to-peer communication and the categories the agents use to interpret these labels become aligned as a side-effect of peer-to-peer information exchange. The labels used in information exchange as well as the semantics of the labels is emergent and the conceptual schemata used for the meta-data in each peer are local (independent of the schemas used by other peers) and extensible.

A sort of Interlingua emerges through the agent interactions. This Interlingua will never be static and may be locally specialized among a group of peers. The categories defining the ontology of each agent are defined purely in terms of local meta-data and so they are not uniform.

The present invention provides information systems as described in the accompanying claims, adapted to achieve semantic interoperability with other information systems with which it may exchange information over a peer-to-peer network.

The present invention further provides information-exchange methods used by such information systems.

The present invention yet further provides a peer-to-peer information-exchange network comprising information systems operable in a client mode or server mode, as described in the accompanying claims, adapted to develop semantic interoperability.

The present invention still further provides a method of managing information exchange between information systems in a peer-to-peer network, as described in the accompanying claims.

Further features and advantages of the present invention will become clear from the following description of preferred embodiments thereof, given by way of example, and the accompanying drawings, in which.

Figure 1:
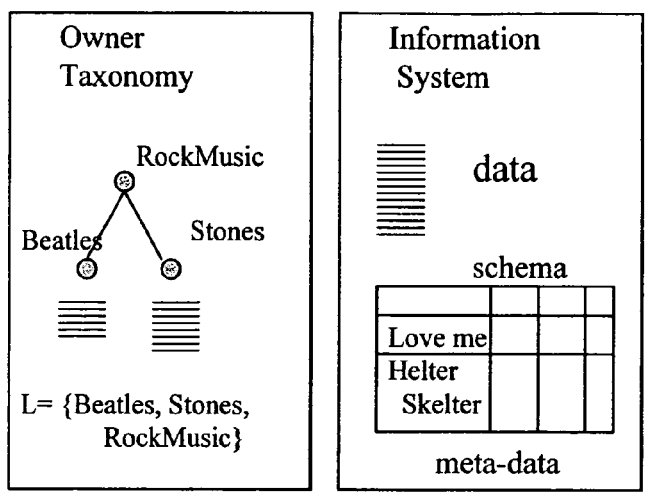
FIG. 1 is a diagram illustrating the structuring of data in a conventional information system and an owner-defined taxonomy.
Figure 2:
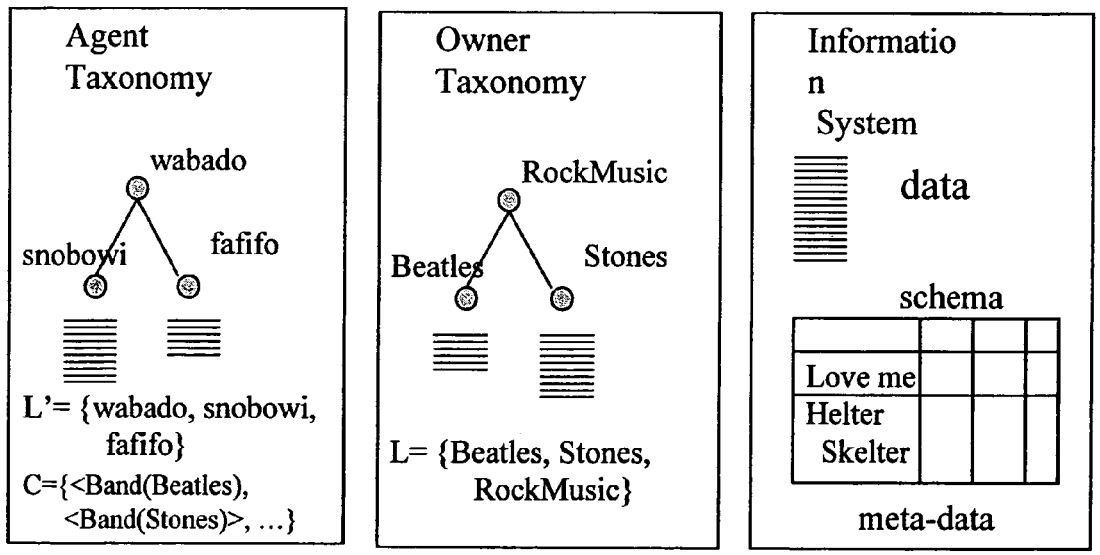
FIG. 2 is a diagram illustrating the taxonomy of an agent associated with an information system in a preferred embodiment of the invention.

First the mechanisms underlying the SASI approach, according to the preferred embodiments of the present invention, will be described with reference to FIGS. 2 and 3.

According to the preferred embodiments of the present invention, an information system which is to be used in peer-to-peer information exchange is provided with an additional component called an information agent (IA). This agent will be responsible for orchestrating the interaction between peers. In general, the information agent will be implemented in software. The details of the way in which the information agent is implemented are not pertinent to understanding of the present invention and, in any event, will readily be apparent to the skilled person in view of the information given below with regard to the functions performed by the agent. Accordingly, no further information in that regard is included here.

At this stage it is helpful to include some formal definitions.

Definitions

The preferred embodiments of the invention make use of a Peer Information System PI which consists of a 3-tuple:

PI=<IS, O, IA> where
- IS=<D, MD, L, M> is an information system which consists of a set of data D, a set of meta-data MD, a set of names L and a taxonomy $M: L \rightarrow P(D)$ mapping names to subsets of D through enumeration (P(D) being the power set of D, i.e. the set of all subsets of D). It is possible that the information system maintains several taxonomies over the same data. The names and the taxonomy implicitly define the user ontology of the information system.
- O a (human) owner which manages the information system in the sense of adding or deleting data and organizing the data into the taxonomy M. The owner does not necessarily have access to or knowledge about the meta-data available to his own information system.
- IA=<L', M> is an information agent which defines a set of labels L', and another taxonomy $M: L' \rightarrow P(D)$ mapping the labels L' to subsets of D. The taxonomy of the information agent is not defined by enumeration but based on a set of categories (as explained below).

A peer-to-peer information network N consists of a set of peer information systems: $N=\{PI_1, \ldots, PI_n\}$. It is assumed that the owner $O_c$ of an Information System $PI_c$ (further called the client) is interested in obtaining information from another peer information system $PI_s$ (the server) owned by another user $O_s$, by querying. When formulating a query, human users employ the local taxonomy M that they imposed on the data. Communication between peers is in terms of the labels $L'_i$ used by their information agents.

The peer-to-peer information networks being considered here are entirely open-ended. New data, new meta-data, new labels, or a change in M can be introduced by the owner of a PI at any time. New peer information systems can be added or deleted from the total network, and there is no restriction on which peer can communicate with which other peer.

In the idealized case, for all PI in N it is true that $L_i=L'_i$, $M_i=M'_i$, in other words the Information Agent uses the same labels and the same mapping as set up by its owner, and all peer information systems in the network (all PI in N) use the same L and M:

$$\forall i, j\ PI_i, PI_j \in P \rightarrow L_i = L_j \text{ and } M_i = M_j.$$

If these conditions did, in fact hold, then peer-to-peer exchange of information would be a trivial issue. A client would issue a query by transmitting the label $l \in L_c$ where $(l, D_l) \in M_c$ and $D_l$ is the set of data that is of the sort the client is querying for. The server responds with data resulting from the application of his own mapping $M_s$ to his own data set. So the query with label l evokes from the server s a response R that is equal to a subset of D, that is: $R=\{d_k, \ldots, d_{kp}\} \subset D_s$ where $(l, R) \in M_s$. Since owner and agent taxonomies are the same, the information agents do not have to play a role.

For example, if the client has a set of papers $p_1, \ldots, p_n$ on 'emergent semantics', i.e. $M_c(\text{'emergent-semantics'})=\{p_1, \ldots, p_n\}$, then to obtain more papers on the same topic the client sends the label 'emergent semantics' to another peer acting as server. Suppose $M_s(\text{'emergent-semantics'})=\{q_1, \ldots, q_m\}$, then each $q_j$ is a candidate for transmission as a response.

In the real world, owners of peer information systems (PI) in a network (N) generally use different names L and mappings M from each other (and their information systems will generally use meta-data organized according to different schemas). Consequently the names and mappings used by a client $PI_c$ are not necessarily the same as those used by a server $PI_s$. According to the preferred embodiments of the invention, the labels and mappings used by the information agents are not necessarily the same as the names and mappings used by their owners. In other words, for a given $PI \in N$ it is possible that $L_i \neq L'_i$ and $M_i \neq M'_i$.

The preferred embodiments of the invention involve negotiation, by the information agents, of the labels used for communication; at the same time this coordinates the semantics of the categories associated with these labels. In other words, the labels $L'_i$ of all information agents become a 'shared language' that each agent maps onto the local data set of the information system using his own mapping $M'_i$. Note that this implies that the information agent has a similar cognitive capacity to a human user in the sense that the taxonomy is implemented using grounded categories, i.e. categories that can be applied to the meta-data to filter the data into subsets. However it should be noted that an information agent will never be identical to a human user and has to make do with the meta-data at its disposal.

The communication is a success if the response given by a server is deemed relevant to the client's owner. In reality, the sharing will always be partial because the system is in constant flux. Moreover it must be expected that many "sub-languages" will emerge within sub-networks of peers. Each sub-language reflects the interests of a sub-network of peers. In some applications, these sub-networks could correspond to "trusted communities" (perhaps selected by the owner of the information system).

Consider the case where the owner of the client information system initiates a query by identifying a set $G_c \subset D_c$ of data elements that are considered to be good examples of the kind of elements the owner is requesting from the server. The owner can do this by using the labels of the owner taxonomy that remains fully under her control, or by explicitly identifying in some other way a subset of the examples in her information system's data set.

For example, in a case where the Owner's information system consists of a personal computer loaded with music browser software that is connectable to a peer-to-peer network (e.g. via the Internet) to exchange music files, the Owner may identify the selected examples by using a pointing device (keyboard, mouse, etc.) to select a playlist that the Owner has defined in the music browser application. Depending upon the way in which the application is implemented in detail, selection of the playlist by the Owner may cause a search for similar songs to be launched over the peer-to-peer network, or some explicit action by the Owner may be required in order to launch the search. The details of the application software, interfaces and devices that the owner may use to interact with her information system are not particularly relevant to the present invention provided that they enable the Owner to indicate (according to her own taxonomy, if desired) which data she is selecting for search or exchange via the peer-to-peer network.

It is assumed that the Owner's query is formulated within a specific context $K_c \subseteq D_c$, which consists of other data elements (counter-examples) against which $G_c$ is to be distinguished. In the most general case $K_c = D_c \backslash G_c$.

The server responds by a set of data elements $R \subseteq D_s$ and the client's owner gives feedback by indicating those data elements $F \subseteq R$ which she deems relevant, which allows negative examples $B = R \backslash F$ to be computed. The "good" data, F, can then be added to the client's data set, if the client's owner so wishes. If no data elements are relevant, or if the server could not provide any data, the communication has failed and, according to the preferred embodiments of the invention, the information agents will engage in a repair action as detailed below.

Overall performance of the system is measurable in terms of the number of times there was a successful response from a server to a client. Note that the owner of the client plays a crucial role, both in selecting items of interest, in judging whether the items received from the server satisfied the request, and in deciding whether or not to store certain items, and where, according to her own ontology. The role of human users makes the invention crucially different from earlier proposals to exploit emergent language approaches for information exchange, in which owners have no direct influence.

To implement the taxonomy M' that an information agent uses to structure the data, it is assumed that each information agent maintains a set of categories C which operate over the data or the meta-data the agent has access to. For example, a scientific paper may have an author, keywords, publication medium, and an abstract, as accessible meta-data; a music file may have a composer, a performer, time of recording, etc. as associated meta-data.

The agent's set of categories will generally be empty at start-up of the information system, i.e. before the information agent has communicated with other information systems. The information agents build up their own sets of categories as they communicate with one another. A category is operationalized as a function that determines whether a data element belongs to the category or not. The set of categories used by an agent is open-ended and time-dependent, and the categories of different agents are not necessarily the same.

Each agent establishes categories by seeking to differentiate a topic (e.g. a set of examples selected by a user) from a context (e.g. a set of counter-examples). The agent seeks to find a feature, or set of features, which can distinguish the topic from the context. A feature will generally consist of an attribute (such as a particular item of meta-data, e.g. the "Genre" of a stored music file) and a value (e.g. "Rock 'n Roll")—for example the feature <Genre(Rock 'n Roll)>. A feature, or set of features, is "distinctive" if it enables the topic to be differentiated from the context.

There are several well-known techniques for processing topic and context data so as to determine a "category" (feature or feature set) differentiating the topic from the context. In the preferred embodiments of the present invention the information agents can use any convenient technique to determine their categories.

The information agents can use the data itself, as well as any or all meta-data available to them, when seeking to determine the categories. The meta-data may be pre-existing (e.g. loaded into the information system at the same time as the associated data was loaded, stored in a catalogue or on a server that is accessible to the information systems, etc.), or it may be determined automatically (either within the information system or in a device that communicates with it) by analysis of the associated data.

Each information agent maintains a two-way mapping W from the agent labels L' to the set of categories C. This mapping is also known as the agent's dictionary or lexicon. Each association between a category and a label has a certain strength $\gamma \in [0.0, 1.0]$ which reflects the success that the information agent had in the past in using this association (as defined more precisely later on). If there is more than one label for the same category (in coding) or more than one category for the same label (in decoding), it is advantageous if the agent uses the association which has the highest strength.

These considerations are reflected in the following enriched set of definitions:

A peer information system a at time t can be defined as:

$$PI_{a,t} = <IS_{a,t}, O, IA_{a,t}>$$

where:

$IS_{a,t} = <D_{a,t}, MD_{a,t}, L_{a,t}, M_{a,t}>$ is an information system which consists of a set of data D, a set of meta-data MD, a set of names L and a mapping M:L→P(D) mapping names to subsets of D by an extensional definition.

O is the (human) owner of the information system.

$IA_{a,t} = <L'_{a,t}, C_{a,t}, M'_{a,t}, W_{a,t}>$ is an information agent having a set of labels L', a set of categories C: P(MD)→P(D) and W=C×L'×[0.0,1.0]. The categories implement the taxonomy M'.

A peer-to-peer information network at time t is defined as a set: $N_t = \{PI_{a1,t}, \ldots, PI_{an,t}\}$ to which members may be added or removed at any time.

The overall goal of the design is to optimize success in information exchange. The preferred embodiments of the invention define methods by which an information agent a develops and uses the category set $C_a$ and associates them with the set of labels $L'_a$, in cooperation with other agents. A working solution must satisfy some additional constraints: (1) clients cannot access the internal states of servers nor change them, (2) interactions between peers is purely local, (3) peers are autonomous, in the sense that each peer may change at any time, (4) peers are distributed, there is no global synchronization and peers may act in parallel, (5) human owners need not inspect and cannot change the internal states of the information agents.

Figures 3, 4:
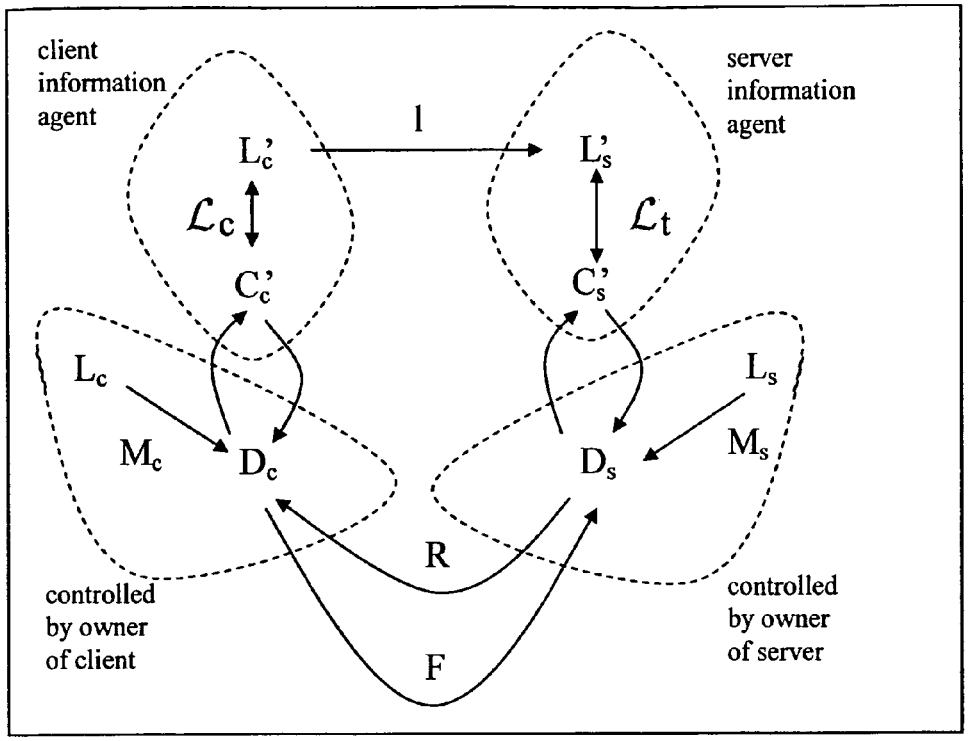
FIG. 3 is a diagram indicating the different information items and mappings involved in peer-to-peer exchanges according to preferred embodiments of the invention.
FIG. 4 is a diagram illustrating a first peer-to-peer exchange.

The different entities, information items and mappings involved in the processes to be described in detail in the remainder of this document are summarized in FIG. 3. In FIG. 3, L indicates an information agent's lexicon.

Static System

To simplify the explanation, the protocol used by information agents for a "static" system will be detailed first, i.e. assuming that the information agents have the necessary categories and exchange labels to be able to engage in peer-to-peer information exchange. Afterwards, the description will continue on to consider the necessary extensions to make the system "dynamic" (that is, a system in which the information agents adaptively define their categories and labels).

The protocol used in the static system is illustrated in FIG. 4 which shows processes that occur during a particular peer-to-peer transaction in which a client emits a query to a server.

Incidentally, in each of the figures used to illustrate transactions between peers, the left-hand side details the actions taken on the client side and the right-hand side indicates the actions on the server side. In the middle of each of these figures there are shown the items that are exchanged between client and server.

Note that in the "static-system" transaction of FIG. 4 the owner of the client is in control for choosing the initial target set $G_c$ and the context $K_c$, and for determining which subset of the response R is relevant and should be stored as part of his own information system.

The implementation of the interaction illustrated in FIG. 4 requires the definition of four functions: categorize (client step 2), filter (server step 2), code (client step 3), and decode (server step 1).

The present invention is applicable to information exchange of different types between peers, e.g. queries (or offers) relating to scientific papers, recommended websites, movies, images, music, etc. The global context of a particular query can be determined implicitly—for example, based on earlier interactions between the client and server, based on the nature of the peer-to-peer network itself (it may be a network dedicated to exchange of music files), etc.—or it can be determined explicitly—for example, based on the syntax of the query.

The particular context $K_c$ of the client's query is either implicitly determined by previous interactions or, by default, equal to the total set of possible objects: $K_c=D_c$. Similarly, the context within which the server operates $K_s$ is either implicitly determined by previous interactions or, by default, the total set of data elements of the server: $K_s=D_s$. It is also possible that the client will send data identifying a context (the bad examples) along with the target set (the good examples). The method for context determination depends on the specific application and the history of interactions of the user with her information system.

Incidentally, in cases where the client sends examples and/or counter-examples to the server, the examples/counter-examples can be transmitted in any convenient manner. For example, a code identifying the example/counter-example in an online catalogue could be transmitted, the MP3 file corresponding to the example/counter-example could be transmitted, etc.

Categorisation and Filtering

The self-organization of peer-to-peer information exchange requires that each information agent has a way to discriminate the members of a set of data G as different from another set K. As data sets can change at all times, the set of categories used in discrimination may need to be adapted as well.

Let G be the target set of examples and K be the context against which the elements of G need to be discriminated. Let $c_i \epsilon C$ be defined as a function that, given a data element d, returns 1 or 0, depending on whether d belongs to the category defined by $c_i$ or not. $\phi(S,c_i)$ is the percentage of elements in a set S for which $c_i$ is true: $\phi(S,c_i)=1/n\Sigma_j c_i(d_j), d_j \epsilon S$.

The discriminative success disc of a category $c_i$ given G and K can then be defined as:

$$\text{disc}(G,K,c_i)=\phi(G,c_i)-\phi(K,c_i),$$

and the categories $c_i \epsilon C_{a,t}$ can be ordered in descending order based on discriminative success:

$$[<c_i, p_1>, \ldots, <c_m, p_m>]$$

with $c_i \epsilon C$, and $p_i=\text{disc}(T,G,c_i)$, and $p_i, p_{i+1} \rightarrow p_i \geq p_{i+1}$.

Clearly, the better $c_i$ distinguishes the elements in G from the elements in K, the greater disc(G,K,$c_i$) will be and, hence, the first element of the above sequence corresponds to the most discriminating category: Thus the function of categorizing a selected topic G from a context K, given a set of categories, C, can be expressed as:

$$\text{categorize}(C,G,K)=\text{first}([<c_1, p_1>, \ldots, <c_m, p_m>])$$

In the case where several categories $c_i, \ldots, c_n$ have a maximum discriminative capacity, i.e. $p_i=\ldots=p_n$ and $p_i, \ldots, p_n>p_j$, then the information agent may use additional heuristics in choosing the category to select for G. For example, it may retain the category that has been used most successfully in previous exchanges with other agents. If the discriminative capacity of the best category $c_i$ is insufficient (e.g. compared with a threshold level, $\theta_{disc}$, i.e. $p_i<\theta_{disc}$), then the agent will try to make a new category in preference to reusing the existing one(s).

A category can be used as a filter to select which elements satisfy it:

$$\text{filter}(D,c)=\{d_i | d_i \epsilon D \text{ and } c(d_i)=1\}$$

The categories of one information agent may be entirely different from those of another agent and are assumed to be completely local to the agent. The information agent's categories are not directly visible to the owner of the information system and may, in fact, be quite different from the taxonomy that the owner has imposed on the data. It is preferable to design the system such that human owners are not allowed to tamper with the names used by the agents. This avoids human interference that may be harmful to the emergence of the Interlingua and, more importantly, avoids the risk of malicious invasion by hackers who might attempt to manipulate the Interlingua so that it becomes unusable.

Categories may make use of any kind of data, meta-data, or additional resources that are available to compute the category. Categories can also be more fuzzy as opposed to returning 0 or 1 and a lower threshold could be used in the filter function. The skilled person will be well aware of many different ways to implement a categorizer and various ways in which new categories can be constructed. The present invention is not limited with regard to the particular way in which the categorizer is implemented or new categories constructed.

It is also straightforward to consider that instead of single categories, conjunctions of categories are used (which minimizes the number of categories and reduces the number of attributes that are needed as meta-data).

Coding and Decoding

The next issue is how the agent should code and decode the labels used for peer-to-peer exchange, assuming the agent is able to relate categories with labels: $W=C \times L' \times [0.0, 1.0]$.

Assuming that the category c needs to be expressed, then the agent can construct the list of possible labels as an ordered set based on the strength γ of the relation between c and a label l:

$$\text{labels}(c,W)=[<l_1,\gamma_1>,\ldots,<l_n,\gamma_n>]$$

with $<c,l_i,\gamma_i> \in W$ and $\gamma_i \geq \gamma_{i+1}$

The coded label is the first entry in this ordered set:

$$\text{code}(c,W)=\text{first}(\text{labels}(c,W)).$$

Conversely, given a label l, then the information agent can construct the list of possible categories as an ordered set based on the strength γ of the relation between l and a category c:

$$\text{cats}(l,W)=([<c_1,\gamma_1>,\ldots,<c_n,\gamma_n>])$$

with $<c_i,l,\gamma_i> \in W$ and $\gamma_i \geq \gamma_{i+1}$

The decoded category is the first entry in this ordered set:

$$\text{decode}(l,W)=\text{first}(\text{cats}(l,W)).$$

This process can be easily extended to coding or decoding conjunctions (i.e. sets) of categories.

The lexicon W can associate a set of categories with a word. Coding should seek the minimal number of words that cover the set of categories resulting from discrimination, and decoding should reconstruct the minimal set of categories that are associated with each of the words.

Dynamic System

The following description considers the mechanisms by which client and server agents change their inventories (L', W, C) to deal with failures in communication and adapt their internal states to be more successful in the future.

One key idea implemented in preferred embodiments of the invention is to use examples of data elements as a way to fix failure in an information exchange, which is similar to pointing to objects in a human communication.

If the server does not know a particular label yet the client can show the server examples (and counter-examples) corresponding to the client's query. The number of examples and counter-examples exchanged by the client and server is not particularly limited. Obviously, the greater the number of examples/counter-examples that are provided, the more precise an indication will be obtained as to the nature of the intended category. However, increasing the number of examples/counter-examples causes greater bandwidth to be occupied in communications between the client and server, and increases processing time. In the preferred embodiments of the invention if there are more examples/counter-examples available than it is desired to transmit, then a selection is made from amongst the available examples/counter-examples. It is advantageous if this selection includes counter-example data as well as example data.

The server gets feedback as to whether the data it transmitted in response to a query was relevant and, hence, can also align its labels and categories to that of the client.

There are 5 types of situations that need to be considered:

Successful Interaction: This should trigger a re-enforcement of the categories and conventions (in the sense of label/category association) used by the agents.

Failure by client: This should trigger the creation of a new category and a new label for this category.

Failure by server: This should trigger the adoption of a new label and potentially the creation of a new category by the server or the client.

Partial success: This occurs when the server is able to decode the label but the results returned by the server are deemed to be partly irrelevant to the client's owner.

Successful Interaction

If the interaction succeeds completely, the "relevant set" F identified by the client is non-empty and is equal to R, in other words the client received only good examples and signals this fact to the server. This implies that the label, l, naming $\text{cat}_c$, as used by the client, was compatible both with the interpretation of this label by the server (as $\text{cat}_s$) and with the intentions of the user. In this case, both client and server update their mappings from labels to categories so that the use of the label l for the categories $\text{cat}_c$ and $\text{cat}_c$ is reinforced in the future. This is done by increasing the relation (binding "strength") between the used label and the used category with a quantity $\Delta_{inc}$, and diminishing competing relations. Competitors are relations that either use another label for the same category, in which case they are decreased with $\Delta_{n\text{-}inh}$, or relations that, in the past, have associated another category with the same label, in which case they are decreased with $\Delta_{o\text{-}inh}$. More formally:

1. ClientUpdate($W_{c,t}$,l,$\text{cat}_c$) is defined as:

$$W_{c,t+1}=\{r_i|r_i=<c_i,l_i,\gamma_i>\in W_{c,t} \text{ with } c_i\neq\text{cat}_c \text{ and } l_i\neq l\}\cup$$

$$\{<\text{cat}_c,l,\gamma_i+\Delta_{inc}> \text{ for } w_c=<\text{cat}_c,l,\gamma_i>\in W_{c,t}\}\cup$$

$$\{r_j|r_j=<\text{cat}_c,l_j,\gamma_i+\Delta_{n\text{-}inc}>\in W_{c,t} \text{ with } l_j\neq l\}\cup$$

$$\{r_j|r_j=<c_j,l,\gamma_j+\Delta_{o\text{-}inh}>\in W_{c,t} \text{ with } c_j\neq\text{cat}_c\}$$

2. ServerUpdate($W_{s,t}$,l,$\text{cat}_s$) is defined as $$W_{s,t+1}=\{r_i|r_i=<c_i,l_i,\gamma_i>\in W_{s,t} \text{ with } c_i\neq\text{cat}_s \text{ and } l_i\neq l\}\cup$$

$$\{<\text{cat}_c,l,\gamma_i+\Delta_{inc}> \text{ for } w_s=<\text{cat}_s,l,\gamma_i>\in W_{s,t}\}\cup$$

$$\{r_j|r_j=<\text{cat}_s,l_j,\gamma_i+\Delta_{n\text{-}inh}>\in W_{s,t} \text{ with } l_j\neq l\}\cup$$

$$\{r_j|r_j=<c_j,l,\gamma_j+\Delta_{o\text{-}inh}>\in W_{s,t} \text{ with } c_j\neq\text{cat}_s\}$$

When $\Delta_{o\text{-}inh}<0$ and $\Delta_{n\text{-}inh}<0$ there is said to be lateral inhibition.

Failure by Client

Consider next the situation in which the client does not have a category to discriminate $G_c$ from $K_c$ (client step 2 fails). In that case, the client performs two steps:

The client constructs a new category $\text{cat}_n$ that distinguishes the elements in $G_c$ from those in $K_c$.

The client invents a new label σ (a random string drawn from a sufficiently large alphabet) and extends W with a new relation between σ and $\text{cat}_n$ with an initial value for the strength being $\gamma_{init}$.

The interaction between client and server can now continue as before with the transmission of σ as new label.

An important issue arises when the random string was already used by another agent for another category. This issue (known as homonymy: one label having different meanings) is dealt with by the dynamics of the system according to the preferred embodiments of the invention, but it can be minimized by using a technique that guarantees unique symbols even if generated in a distributed fashion, such as "universally unique identifiers" (UUID) see "A UUID URN Namespace" by Leach et al, The Internet Engineering Task Force, Internet drafts, http://www.ietf.org/internet-drafts/draft-mealling-uuid-urn-03.txt.

Failure by Server

Figure 5:
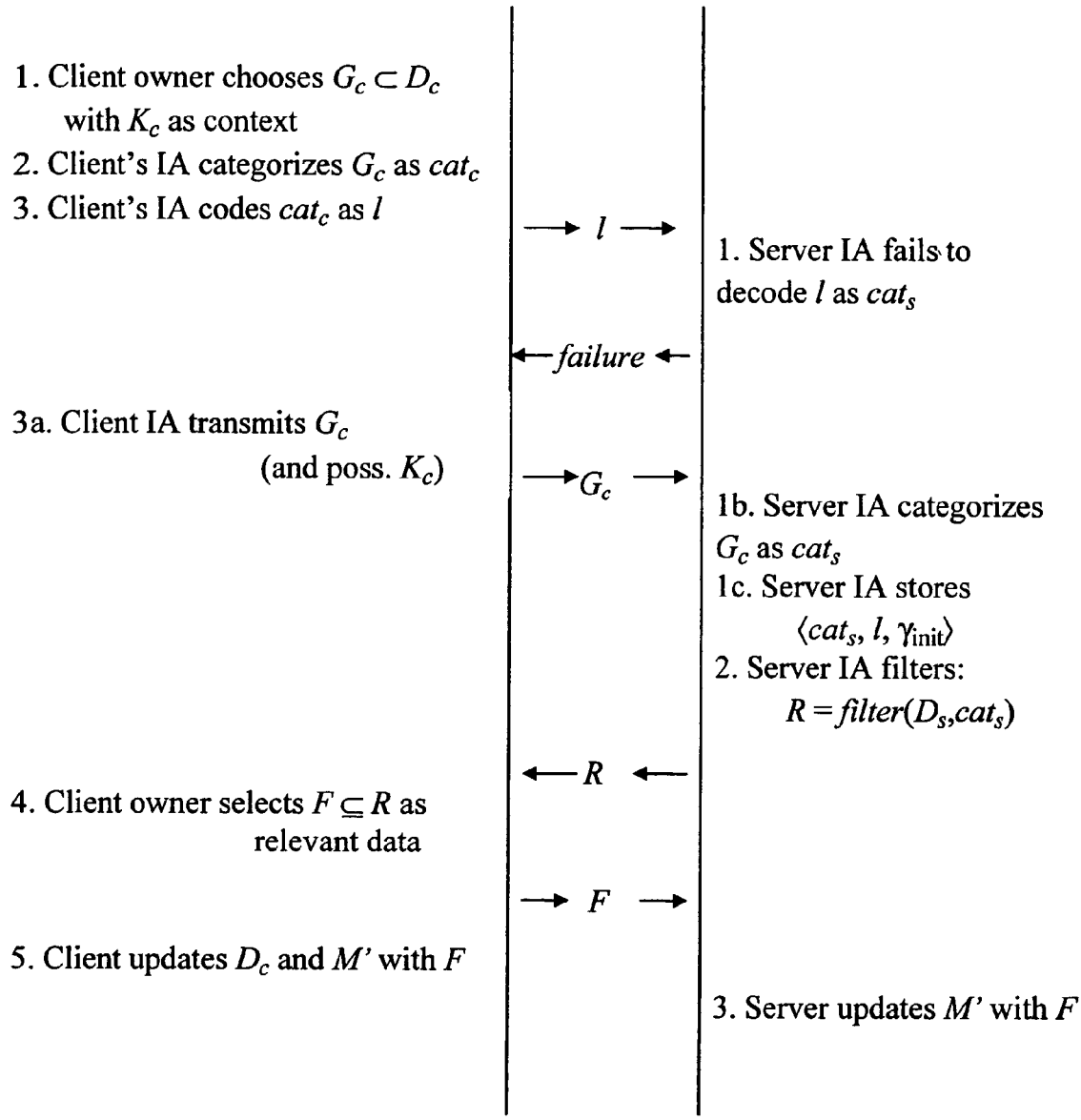
FIG. 5 is a diagram illustrating a second peer-to-peer exchange.

Next consider the case where the server does not have the label l defined in $W_s$ and this label was transmitted by the client (server step 1 fails). FIG. 5 illustrates the processes that are implemented in this case according to the preferred embodiments of the invention.

In this case, the server signals failure to the client. The server then receives $G_c$ (and possibly $K_c$) as examples of what the client is looking for, and goes through the following steps:

Server IA categorises $G_c$ as distinctive from the context $K_c$ with the category $cat_s$. When this fails, the server IA creates a new category (further called $cat_s$) and adds it to its categorial repertoire.

Server IA extends $W_s$ with a relation between $cat_s$, the label l, and an initial strength $\gamma_{init}$.

Then the server continues the game as before.

Partial Success

The next case occurs when the server's response to the client's query is deemed to be partly irrelevant by the (owner of the) server. A score (i.e. a measure of the degree of "appropriateness" of the server's response) can be computed which is simply the percentage of elements that were deemed appropriate by the owner. Failure occurs if this "appropriateness" score is below a certain threshold level $\theta_{fail}$.

There are two causes for this problem: (1) The category associated with the transmitted label by the client is different from the category associated with the same label by the server, or (2) the category used by the client is not precise enough to capture the distinction that was intended by the user. In order to distinguish case (1) from case (2), the client agent could check whether the category used to formulate the query was adequate, i.e. whether $cat_s$ is a good distinctive description distinguishing $G_c \cup F$ from $K_c \cup B$. If this is not the case, it means that $cat_s$ was not a good reflection of the clients owner's intention, i.e. that case (2) is applicable.

To deal with case (1), client and server should try to coordinate their categories and labels so that exchange becomes possible or fruitful in the future. Actions are necessary both from the client side and the server side. First of all, the strength of the labels they used in the failed communication are to be diminished:

Client IA diminishes the relation strength between $cat_s$ and l in $W_c$ by a factor $\Delta_{dec}$. This will decrease the chance that the relation is coded in the future with this particular label.

Server IA diminishes the relation strength between $cat_s$ and l in $W_s$ by a factor $\Delta_{dec}$. This will decrease the chance that l is decoded in the future with this relation.

To deal with case (2), the client (more particularly, the Information Agent thereof) should try first, based on the owner's evaluation of the relevance of the received data, to come up with a better category than the one used so far. This means that the IA has to find a distinctive category to distinguish $G_c \cup F$ (the good examples) from $K_c \cup B$ (the bad examples).

The interaction then becomes identical to case 2 (failure by client) using $G_c$:∪F instead of $G_c$, and $K_c$:∪B instead of $K_c$: the client will create a new category and a new label that is associated with this category. This new label is transmitted to the server, possibly together with other examples of the objects of interest $G_c \cup F$. The server should now be able to build up its own version of this category and, thus, construct the semantics of the label. The server can send new examples to the client in reply.

If the client was not able to come up with a better category than the one used in the first transaction, the client IA can send examples and counter-examples of the objects of interest, $G_c \cup F$ and $K_c \cup B$, so that the server can attempt to acquire the right meaning of the already-transmitted-label, l, by finding a distinctive category and by adding an association between this category and the label l. This case then becomes identical to the one discussed earlier case 3 (failure by server).

Parameters

Below there is an example of the values that can be taken by certain main parameters in the agent's adaptive mechanisms; the listed values have empirically proven to yield adequate performance in large-scale tests of the system. Good system performance has been achieved based on the assumption that each information agent seeks to respond to queries to the best of its ability (i.e. using the "best" available word in its lexicon for a particular category).

Example of Parameter Values:

$\gamma_{init}$ is the initial strength with which a new relation enters into the lexicon $\mathcal{L}$ of the agents. $\gamma_{init}=0.5$.

$\Delta_{inc}$ is the increase of $\gamma$ in the relation used, in the case where there is success. $\Delta_{inc}=0.1$ $\Delta_{n-inh}$ is the change (decrease) of relations having the same name (but different categories) in the case where there is success. $\Delta_{n-inh}=-0.2$ $\Delta_{o-inh}$ is the change (decrease) of relations linked to the same category (but different names) in the case where there is success. $\Delta_{o-inh}=-0.1$ $\Delta_{dec}$ is the change (decrease) of $\gamma$ in the relation used, in the case where there is failure. $\Delta_{dec}=-0.1$ $\theta_{disc}$ is the threshold used in the categorization. $\theta_{disc}=0.5$ $\theta_{fail}$ is the threshold used to signal a failed exchange (insufficient results provided by the server). $\theta_{fail}=0.5$ There is a degree of leeway with the exact value of these parameters. It is even possible to make all of them=0 (accept $\gamma_{init}$) but then all labels ever invented by any agent will propagate in the overall population of agents and there is no drive towards convergence. If they are non-zero, then obviously $\Delta_{inc}>0$ and $\Delta_{n-inh}<0$, $\Delta_{o-inh}<0$. Also $\Delta_{dec}<0$ because otherwise a relation that is not successful would increase in strength.

"Synonymy" means that the same category has different labels for different agents (or even the same agent), which arises naturally in a distributed system because different agents invent different labels. The dynamics of the system guarantee that, progressively, synonyms disappear from the system due to the feedback loop between use and success. The more a label is successful to name a particular category, the higher the strength will become linking that label to the category and the more that same label will be used in future communication. The lateral inhibition (through $\Delta_{n-inh}\neq 0$) guarantees that this is the case.

"Homonymy" means that the same label is associated with different categories. This may arise because (1) agents construct accidentally the same new string for a label, or (2) because a server agent guessed another category than used by the client but the exchange was nevertheless successful. The inventors' experiments show that the semiotic dynamics generated by the protocols according to the preferred embodiments of the invention is enough to handle homonymy as well, specifically if $\Delta_{o-inh}<0$ However, as mentioned earlier, case (1) can be avoided by using a system that virtually guarantees unique labels, such as the UUID technology.

In the preferred embodiments of the invention, the magnitude of the increment used to decrease the strength of a binding between a label and a category is equal to or greater than the magnitude of the increment used when increasing the strength of a binding between a label and a category.

Figure 6:
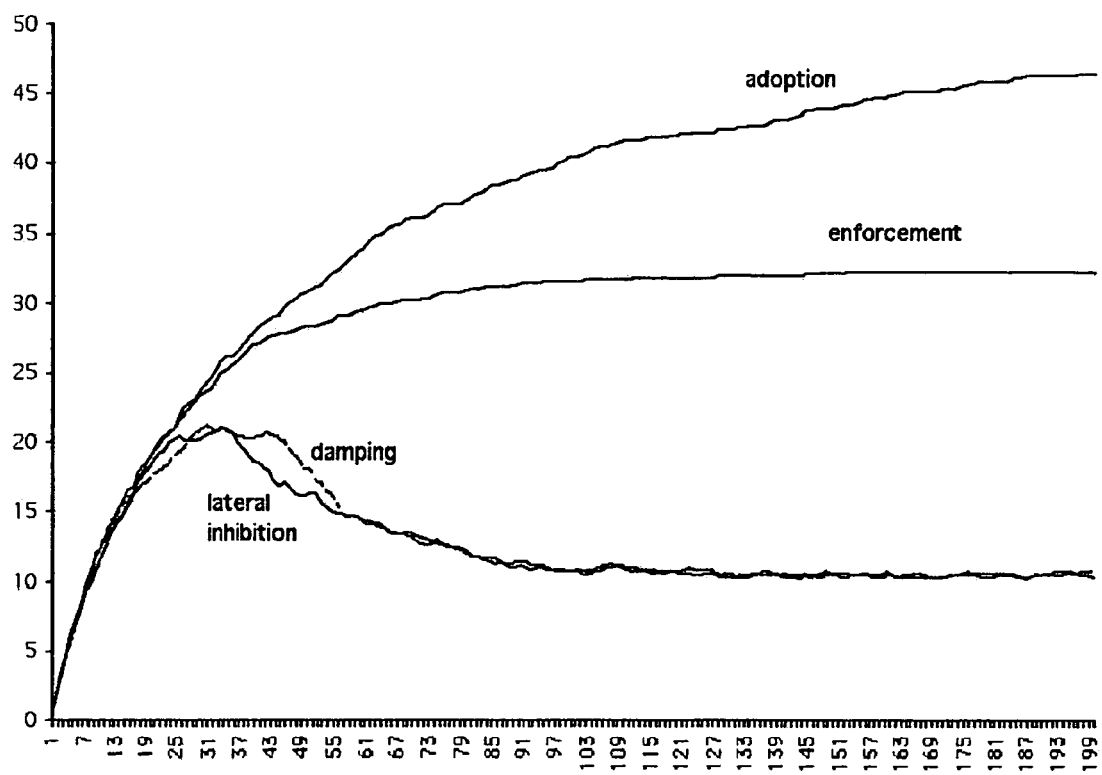
FIG. 6 is a graph showing how different parameters affect the development of a common lexicon between information systems.

FIG. 6 is a graph, based on results of numerical simulations, illustrating the effect of the different parameters on convergence of agent lexicons. The x-axis represents the number of one-to-one interactions between agents and the y-axis represents the average number of non-zero strength associations between labels and categories in the agent lexicons. In FIG. 6, the expression "adoption" indicates that all model parameters are zero and all possible labels propagate (a limit is reached when all agents know all labels used by others); the expression "enforcement" indicates that $\Delta_{inc}$ is positive (here equal to 0.1); "lateral inhibition" indicates that $\Delta_{n-inh}$ and $\Delta_{o-inh}$ are negative (here equal to −0.2 and −0.1, respectively); "damping" indicates that $\Delta_{dec}$ is negative (here equal to −0.1). damping appears to give a result that is slightly less than optimal but it is needed to combat homonymy.

The information-exchange methods of the preferred embodiments of the invention enable the information agents of peers in a peer-to-peer network to evolve semantically-grounded categories and labels that are aligned with one another. It can be considered that the peers' categories/labels gradually converge. However, not all sequences of exchanges between peers lead to convergence to an optimum solution, the network may become stuck in a "local minimum". The lateral inhibition process used in the preferred embodiments of the invention helps to avoid this situation.

Now a description will be made of three examples of concrete applications of the present invention; the first example relates to the domain of music file sharing, the second example relates to the domain of document exchange, and the third example concerns the domain of sharing product information. These applications show in more detail how the present invention works in practice, and demonstrate how generic this approach is. Indeed the mechanisms proposed here can be used in any peer-to-peer information exchange system.

EXAMPLE APPLICATION 1

Music File Sharing

This example concerns a peer-to-peer network in which music (songs) is exchanged between peers. Interactions occurring between a first, second and third information system will be considered. The first information system belongs to a first user, Owner0, and has an information agent, Agent0. The second and third information systems belong to a second user, Owner1, and to a third user, Owner2, respectively, and have respective information agents, Agent1 and Agent2. A series of four queries between these three information systems will now be described.

The preferred embodiments of the invention enable exchanges to be made between peers even in the case where the different information systems associated with the peers make use of meta-data organized according to respective different conceptual schemas. However, for simplicity, it will be assumed here that all three information systems store (or have access to) music files and that they all make use of the same types of meta-data to describe those music files (this meta-data being organized according to the same conceptual schema for all of the information systems). In this example the meta-data is organized according to the following conceptual schema:
- Artist: the name of the artist (The Beatles, The Rolling Stones, Deep Purple, Madonna, Michael Jackson, or Elvis Presley).
- Genre: the genre of the song (Rock 'n Roll, Rock, or Pop).
- Tempo: the tempo of the song (Slow, Moderate, or Fast).

Table 1 below gives a summary of the data and associated meta-data used across the three information systems in this example.

TABLE 1

| Song | Artist | Genre | Tempo |
| --- | --- | --- | --- |
| Across The Universe | The Beatles | Pop | Moderate |
| And I Love Her | The Beatles | Rock 'n Roll | Slow |
| Blackbird | The Beatles | Pop | Slow |
| Eleanor Rigby | The Beatles | Pop | Slow |
| Helter Skelter | The Beatles | Rock | Fast |
| I Feel Fine | The Beatles | Rock 'n Roll | Fast |
| I'm Down | The Beatles | Rock 'n Roll | Fast |
| Let's Spend the Night Together | The Rolling Stones | Rock | Fast |
| Norwegian Wood | The Beatles | Pop | Slow |
| Paint It Black | The Rolling Stones | Rock | Fast |
| Ruby Tuesday | The Rolling Stones | Rock | Moderate |
| Smoke on the Water | Deep Purple | Rock | Moderate |
| Twist and Shout | The Beatles | Rock 'n Roll | Fast |
| You Know My Name | The Beatles | Pop | Moderate |
| Billie Jean | Michael Jackson | Pop | Fast |
| Borderline | Madonna | Pop | Fast |
| Love Me Tender | Elvis Presley | Rock 'n Roll | Slow |
| Don't Be Cruel | Elvis Presley | Rock 'n Roll | Moderate |
| Suspicious Minds | Elvis Presley | Rock 'n Roll | Moderate |

The owners of the three information systems organize their own data (songs) into playlists which contain lists of song titles. The music file itself may be held in the information system; alternatively, the information system may merely store some indicia enabling the song to be identified, with the music file being accessed—for example, by downloading, by reading from a storage medium or access via a network—when selected for playback by the owner of the information system.

Tables 2, 3 and 4 below show the playlists of Owner0, Owner1 and Owner2, respectively, before any exchanges have taken place between them.

TABLE 2

| Owner0's Label for Playlist | Songs in Playlist |
| --- | --- |
| Beatles | Across The Universe |
|  | Blackbird |
|  | Eleanor Rigby |
|  | Helter Skelter |
|  | I Feel Fine |
|  | Norwegian Wood |
|  | You Know My Name |
| Stones | Let's Spend the Night Together |
|  | Ruby Tuesday |

TABLE 3

| Owner1's Label for Playlist | Songs in Playlist |
| --- | --- |
| Sixties | And I Love Her |
|  | I'm Down |
|  | Paint It Black |
|  | Twist and Shout |
| seventies | Let's Spend the Night Together |
|  | Smoke on the Water |
| eighties | Borderline |
|  | Billie Jean |

TABLE 4

| Owner2's Label for Playlist | Songs in Playlist |
| --- | --- |
| party music | I'm Down |
| | Twist and Shout |

It will be noted that the owners' playlists as shown in Tables 2 to 4 do not list meta-data for the different songs. Often meta-data is not displayed for the user of a music browser application or the like. Nevertheless, regardless of whether or not the meta-data is displayed to the user, this meta-data is available within the information system (or accessible to it, e.g. by audio fingerprinting, sending an MP3 version of the song to an online service which provides meta-data for this song in return, etc.) and is used by the information agent.

At the start of the interactions between these peers, none of the agents has any labels or categories defined.

Query 1: An Example of Category-Creation and Successful Communication

Consider a first interaction in which Owner0 wishes to obtain from Owner1 more songs for her "beatles" playlist. In practice, Owner0 is likely to express a desire to obtain more songs for this playlist by interacting with some interface with the information system, such as the graphical user interface of a music browser program. Owner0 may or may not explicitly identify the peer from which the new songs should be obtained.

When Owner0 indicates that she wants more songs for her "beatles" playlist, the agent (Agent0) associated with the first information system handles the search for similar songs. Because Owner0 did not select the playlist "stones", the context for this request is "beatles" as opposed to "stones". Owner0's agent thus interprets the request as "find more beatles, not stones".

The set of songs used as examples for the request are: "Across The Universe", "Blackbird", "Eleanor Rigby", "Helter Skelter", "I Feel Fine", "Norwegian Wood" and "You Know My Name".

The set of songs used as counter-examples for the request are: "Let's Spend the Night Together", and "Ruby Tuesday".

The steps taken by the system in order to fulfill Owner0's request are as follows:

Step 1: Agent0—Categorize

Agent0 tries to find a category that fits the selection that has been made by Owner0. This step fails because Agent0 has no categories.

Step 2: Agent0—Create Category

Agent0 introduces a new category, Category0, to describe Owner0's selection. Category0 is defined by the feature Artist (TheBeatles)—it can be considered that this feature is a tuple consisting of an attribute (Artist) and a value (The Beatles). If Agent0 is to search for other songs in this category then it needs a word or label to denote this category when communicating with other information systems. Agent0 introduces a label "fafafa" and binds this label to Category0 with a default strength of 0.5. In other words: (Category0<Artist(TheBeatles)>, "fafafa", 0.5).

Agent0 codes Owner0's search request using the label "fafafa".

There is no particular technical reason for the selection of this particular label "fafafa", it is merely a sequence of characters chosen from a predetermined set (or "alphabet"). However, in some applications it may be advantageous to derive labels from Universally Unique Identifiers (UUID) mentioned above. If the labels are derived from UUIDs then they are almost guaranteed to be unique even without any central coordination—this reduces the frequency of occurrence of homonyms.

Step 3: Agent0—Query

Agent0 contacts Agent1 over the peer-to-peer network to ask for songs that fit the label "fafafa". The precise nature and syntax of the communication transmitting "fafafa" can be adapted as desired, e.g. to fit characteristics of the P2P network.

Step 4: Agent1—Decode

Agent1 has no labels in its lexicon, so it cannot assign a category to the received label "fafafa" per se (it cannot decode "fafafa"). Agent1 sends a failure signal to Agent0.

Step 5: Agent0—Transmit

Agent0 now sends to Agent1 the lists of examples and counter-examples which correspond to Owner0's selection. This indicates how "fafafa" is being used by Agent0.

The examples and counter-examples can be "identified" to the server in any convenient way: for example, by communicating a song-ID-code identifying the song in some catalogue (e.g. an on-line catalogue), by identifying the song's title according to some generally-recognized convention, by transmitting an MP3 file corresponding to the song, etc. Whatever approach is used for identifying the examples and counter-examples to the server, the server's information agent (here Agent1) retrieves, or seeks to retrieve, meta-data for these examples/counter-examples according to its own conceptual schema (the meta-data can be retrieved using any convenient method, e.g. by consultation of an online service).

Step 6: Agent1—Create Category

Agent1 processes the set of examples and counter-examples in an attempt to find a distinctive feature (or set of features) which describes the examples and discriminates them from the counter-examples. In the present example, Agent1 manages to find a distinctive feature, namely Artist (TheBeatles). Agent1 creates a new category, which we shall call Category1, corresponding to this distinctive feature and binds the label "fafafa" to Category1 with the default strength of 0.5: (Category1<Artist(TheBeatles)>, "fafafa", 0.5).

Incidentally, in practice Agent1 may use meta-data which is organized according to a different conceptual schema from that used by Agent0. Accordingly, even if Agent1 finds a distinctive feature set to discriminate the examples from the counter-examples, this distinctive feature set will often be different from the distinctive feature set used by Agent0 to discriminate the same examples from the counter-examples. In other words, the distinctive feature set which corresponds to Agent1's Category1 may well be different from the distinctive feature set which corresponds to Agent0's Category0 even though Agent0 and Agent1 are seeking to describe the same set of examples by these categories.

Step 7: Agent0—Query

Agent0 asks Agent1 a second time for songs that fit the label "fafafa". This request can be explicit, or it can be implicit from the fact that Agent0 has transmitted to Agent1 the sets of examples and counter-examples.

Step 8: Agent1—Decode

Agent1 checks the list of categories that are bound to the label "fafafa"; in the present case (and at this time) the list only includes Category1. In other words, the list consists of: (Category1<Artist(TheBeatles)>, "fafafa", 0.5).

Step 9: Agent1—Filter

Agent1 operationalizes Category1 as a function suitable for selecting those songs in the second information system which are described by the feature Artist(TheBeatles). In other words, Agent1 filters its associated dataset using Category1. The resulting songs are "And I Love Her", "I'm Down", and "Twist and Shout".

Step 10: Agent1—Supply

Agent1 transmits to Agent0 the data resulting from Step 9. This transmitted data would, in general, be some data uniquely identifying the retrieved songs: for example, the song title (if this is unique), an ID of the song in some catalogue or database (such as the song's ID in the MusicBrainz database, accessible at http://www.musicbrainz.org), or even the song file itself.

Step 11: Agent0—Select

Agent0 causes Owner0 to be informed of the response received from Agent1. Typically, Owner0 will be presented with a displayed list of the songs supplied by Agent1 (from the second information system). The data supplied in response to Owner0's query may or may not satisfy Owner0's desires. Thus, in preferred embodiments of the invention, Agent0 elicits from Owner0 an evaluation of the results of the query. Agent0 may request an evaluation of the search results explicitly, or this request may be implicit (from the fact that Owner0 has been presented with an indication of the response to her query).

In the present example, all of the results provided by Agent1 fit Owner0's search request and so all are considered to be "positive" results. None of these "good" results is present in Owner0's database and, in this case, Owner0 chooses to add them to her database—Owner0's "beatles" playlist is updated.

Step 12: Agent0—ClientUpdate

The query was successful and 100% of the results were selected by Owner0. As a consequence, Agent0 increments the strength of the binding between the label "fafafa" and Category0 by 0.1. Agent0 now holds (or has access to) the following data on Category0: (Category0<Artist(TheBeatles)>,"fafafa",0.6).

Step 13: Agent0—Feedback

According to the preferred embodiments of the invention, Agent0 provides feedback to Agent1 regarding how satisfactory the supplied results were to Owner0. This feedback can be provided in any convenient form. However, in the preferred embodiments of the invention, the feedback indicates to Agent1 which of the supplied songs were "good" (i.e. satisfied Owner0) and which of the supplied songs were "bad" (i.e. Owner0 considered they did not meet her search criteria). In the present example, Agent0 sends feedback indicating that all of the supplied songs were "good". Obviously, if Owner0 does not give any input to the first information system so as to identify which search results she has found satisfactory, this feedback cannot be provided.

Step 14: Agent1—ServerUpdate

In view of the fact that the server has received feedback indicating that the exchange between the first and second information systems has been completely successful, Agent1 increments the strength of the binding between the label "fafafa" and Category1 by 0.1. Agent1 now holds (or has access to) the following data regarding Category1: (Category1<Artist(TheBeatles)>,"fafafa",0.6).

As a result of Query 1 the first and second information systems have changed. More particularly, the database and playlists of the first information system have changed. Also, the dictionaries of Agent0 and Agent1 have begun to be established. Table 5 below shows Owner0's playlists following Query 1. Tables 6 and 7, respectively, show the dictionaries of Agent0 and Agent1 following Query 1.

TABLE 5

| Owner0's Label for Playlist | Songs in Playlist |
| --- | --- |
| beatles | Across The Universe |
| | And I Love Her |
| | Blackbird |
| | Eleanor Rigby |
| | Helter Skelter |
| | I'm Down |
| | I Feel Fine |
| | Norwegian Wood |
| | Twist and Shout |
| | You Know My Name |
| stones | Let's Spend the Night Together |
| | Ruby Tuesday |

TABLE 6

(Agent0)

| Category | Definition | Label | Strength (of the binding between the label and the category) |
| --- | --- | --- | --- |
| Category0 | Artist(TheBeatles) | fafafa | 0.6 |

TABLE 7

(Agent1)

| Category | Definition | Label | Strength (of the binding between the label and the category) |
| --- | --- | --- | --- |
| Category1 | Artist(TheBeatles) | fafafa | 0.6 |

Query 2: An Example of Client Failure

In the second interaction, Owner1 asks Owner0 for more "sixties" songs. Owner1 selects her "sixties" playlist and asks her information agent (Agent1) to search for similar songs. Agent1 interpret's this request as "find more sixties, not seventies nor eighties".

The set of songs used as examples for this query are: "And I Love Her", "I'm Down", "Paint It Black", and "Twist and Shout".

The set of songs used as counter-examples for this query are: "Let's Spend the Night Together", "Smoke on the Water", "Billie Jean", and "Borderline".

The steps taken by the system as, as follows:

Step 1: Agent1—Categorize

Agent1 tries to find a category that fits the selection that has been made by Owner1. Category1<Artist(TheBeatles)> yields a fitness score of 0.75, which is above the threshold of 0.5. Agent1 thus selects Category1 to describe Owner1's selection of songs.

Step 2: Agent1—Code

As far as Agent1 is concerned, Category1 is bound to only one label, "fafafa". Agent1 thus uses "fafafa" to code the category which it considers to correspond to Owner1's search request.

Step 3: Agent1—Query

Agent1 contacts Agent0 to ask for songs that fit the label "fafafa".

Step 4: Agent0—Decode

As far as Agent0 is concerned, the label "fafafa" is bound to only one category, Category0<Artist(TheBeatles)>. Agent0 therefor uses Category0 for this query.

Step 5: Agent0—Filter

Agent0 operationalizes Category0 as a function suitable for selecting those songs in the first information system which are described by the feature Artist(TheBeatles). In other words, Agent0 filters Owner0's data using Category0<Artist(TheBeatles)>. The resulting songs are "Across the Universe", "Blackbird", "Eleanor Rigby", "Helter Skelter", "I Feel Fine", "Norwegian Wood", "You Know My Name", "And I Love Her", "I'm Down", and "Twist and Shout".

Step 6: Agent0—Supply

Agent0 transmits to Agent1 the data resulting from Step5.

Step 7: Agent1—Select

Agent1 causes Owner1 to be informed of the response received from Agent0 and Owner1 selects which of the supplied songs are "good" (i.e. meet his personal search criteria). In the present example, Owner1 selects "I Feel Fine", "And I Love Her", "I'm Down", and "Twist and Shout". The results "Across the Universe", "Blackbird", "Eleanor Rigby", "Helter Skelter", "Norwegian Wood" and "You Know My Name" are not considered to be appropriate results for Owner1's request ("sixties").

Of the songs supplied by the server only "I Feel Fine" is new to the client (i.e. was not already in the client's dataset). In this case, Owner1 chooses to add "I Feel Fine" to her database, including this title in the "sixties" playlist.

Step 8: Agent1—(Client Failure)

The percentage of "good" results, as decided by Owner1, is 40%. This score is below the predetermined threshold (here 50%) and so is considered to indicate a failure in communication between client and server. Agent1 attempts to determine whether this failure arises because it has misunderstood Owner1's request or because Agent0 decoded Agent1's query wrongly. Agent1 makes this determination, as follows:

Agent1 is in possession of information identifying two sets of "good" examples and two sets of counter-examples relating to Owner1's request. The first of these sets of examples/counter-examples comes from Owner1's initial request and the second of these sets come from Owner1's selection among the results received from the server. Using all of the examples and counter-examples available to it, Agent1 tests if it has an existing category, or a new category, that fits Owner1's request better than the category used so far.

Using the examples ("And I Love Her", "I'm Down", "Paint It Black", "I Feel Fine", and "Twist and Shout") and counter-examples ("Across the Universe", "Blackbird", "Eleanor Rigby", "Helter Skelter", "Norwegian Wood", "You Know My name", "Let's Spend the Night Together", "Smoke on the Water", "Billie Jean", and "Borderline"), Agent1 finds that the distinctive feature set associated with the category it has used to date (Category1) is not the best feature set for distinguishing the examples from the counter-examples. In other words, Agent1 has misinterpreted Owner1's request.

Step 9: Agent1—Create Category

Agent1 takes corrective action and introduces a new category, Category2, defined in terms of the distinctive feature Genre(Rock 'n Roll), and binds Category2 to a new label "fefafa" with a default strength of 0.5. Thus, for Category 2: (Category2<Genre(Rock'nRoll)>,"fefafa", 0.5).

Step 10: Agent1—Transmit

Agent1 transmits the new label "fefafa" to Agent0, together with the list of both sets of examples and counter-examples (that is, $G_c \cup F$ and $K_c \cup B$). This signals implicitly to Agent0 that there has been a communication failure. Alternatively, or additionally, Agent1 may send Agent0 an explicit signal indicating that communication failure has occurred. By providing Agent0 with both sets of examples and counter-examples, Agent0 has a maximum of information available for a subsequent categorization step (Step 12 below).

Step 11: Agent0—Categorize

Having now received the set of examples and counter-examples, Agent0 tries to find an existing category that matches the set of examples and counter-examples. The existing category, Category0<Artist(TheBeatles)> yields a "discriminatory-potential" score of 0.2 when applied to the set of examples and counter-examples. This is below the predetermined threshold level of 0.5. Thus Agent0 should seek to introduce a new category which better discriminates the examples from the counter-examples.

Step 12: Agent0—Create Category

By processing the examples and counter-examples, Agent0 discovers that there is a distinctive feature (Genre(Rock'nRoll)) which discriminates the examples from the counter-examples to a satisfactory extent. Agent0 creates a corresponding new category, Category3, and binds this to the latest received label "fefafa" (which designated the examples and counter-examples). The strength of the binding takes the default value, 0.5. Thus: (Category3<Genre(Rock'nRoll)>, "fefafa",0.5).

As a result of Query 2, the first and second information systems have changed again. More particularly, the database and playlists of the second information system have changed. Also, the dictionaries of Agent0 and Agent1 have developed. Table 8 below shows Owner1's "sixties" playlist following Query 2. Tables 9 and 10, respectively, show the dictionaries of Agent0 and Agent1 following Query 2.

TABLE 8

| Owner1's Label for Playlist | Songs in Playlist |
| --- | --- |
| Sixties | And I Love Her |
|  | I'm Down |
|  | Paint It Black |
|  | Twist and Shout |
|  | I Feel Fine |

TABLE 9

| (for Agent0) | | | |
| --- | --- | --- | --- |
| Category | Definition | Label | Strength (of the binding between the label and the category) |
| Category0 | Artist(TheBeatles) | fafafa | 0.6 |
| Category3 | Genre(Rock'nRoll) | fefafa | 0.5 |

TABLE 10

(for Agent1)

| Category | Definition | Label | Strength (of the binding between the label and the category) |
| --- | --- | --- | --- |
| Category1 | Artist(TheBeatles) | fafafa | 0.6 |
| Category2 | Genre(Rock'nRoll) | fefafa | 0.5 |

Query 3—An Example of Category-Creation and Client Failure

In the third interaction, Owner2 asks Owner0 for more "party music". Owner2 selects her playlist "party music" and asks her agent (Agent2) to search for similar songs. Since Owner2 has only one playlist, there are no counter-examples for this request. The set of songs used as examples are: "I'm Down" and "Twist an Shout".

The steps taken by the system to fulfill this request are, as follows:

Step 1: Agent2—Categorize

Agent2 tries to find a category that fits Owner2's selection. This step fails because Agent2 does not have any categories yet.

Step 2: Agent2—Create Category

Agent2 introduces a new category, Category4, to describe Owner2's selection. Category4 is defined by the feature Artist (TheBeatles). Agent2 introduces the label "fifafa" and binds it to Category4 with the default strength of 0.5, yielding: (Category4<Artist(TheBeatles)>, "fifafa",0.5).

Step 3: Agent2—Query

Agent2 asks Agent0 for songs that fit the description "fifafa" (i.e. Agent2 sends Agent0 the query "fifafa").

Step 4: Agent0—Decode

Agent0 has no label "fifafa" in its lexicon. It signals failure to Agent2.

Incidentally, the present invention is not particularly limited with regard to the manner in which failure is signaled between agents. Notably, failure signals of different types could be used so as to indicate explicitly which type of failure is involved, or the nature of the failure could be inferred from the context in which a particular failure signal is emitted.

Step 5: Agent2—Transmit

Agent2 sends to Agent0 the lists of examples (and, in a suitable case, counter-examples) which demonstrate how "fifafa" is being used.

Step 6: Agent0—Categorize

Agent0 tries to find a category (existing or new) that matches the set of examples and counter-examples. It finds that the existing category, Category0<Artist(TheBeatles)> yields a "discriminatory" score of 1.0, which is above the threshold of 0.5.

Step 7: Agent0—Bind Label

Agent0 binds the label "fifafa" to Category0<Artist(TheBeatles)> with the default strength 0.5. Thus, Agent0 now has two labels bound to Category0, namely "fafafa" and "fifafa".

Step 8: Agent2—Query

Agent2 asks Agent0 a second time for songs that fit the description "fifafa"—once again, this request can be explicit or it can be inferred from the fact that Agent2 sent Agent0 the list of examples/counter-examples.

Step 9: Agent0—Decode

As far as Agent0 is concerned only one category (Category0) is bound to the label "fifafa", and that is Category0<Artist(TheBeatles)>.

Step 10: Agent0—Filter

Agent0 uses Category0 to filter its dataset. The resulting songs are: "Across the Universe", "Blackbird", "Eleanor Rigby", "Helter Skelter", "I Feel Fine", "Norwegian Wood", "You Know My Name", "And I Love her", "I'm Down", and "Twist and Shout".

Step 11: Agent0—Supply

Agent0 transmits to Agent2 the data resulting from Step 10.

Step 12: Agent2—Select

Agent2 asks Owner2 to evaluate the results received from Agent0. Owner2 selects the following results as positive: "I Feel Fine", "Helter Skelter", "I'm Down" and "Twist and Shout". The other songs ("Across the Universe", "Blackbird", "Eleanor Rigby", "Norwegian Wood", "You Know My Name", and "And I Love Her") are not selected as good results.

Of the received "good" results, "I Feel Fine" and "Helter Skelter" are not yet in Owner2's dataset. These two songs are added to Owner2' as database and Owner's "party music" playlist is updated to include the titles of the added songs.

Step 13: Agent2—Client Failure

The percentage of good results, as decided by Owner2, is 40%. This score is below the threshold of 50% and indicates a communication failure.

Agent2 tests whether it has misunderstood Owner2's request or whether Agent0 has decoded the request wrongly. Similar to Agent1 in step 8 of Query2, Agent2 is in the possession of two sets of good examples and two sets of counter-examples. Using all the available examples and counter-examples, Agent2 verifies whether there is an existing category or a new category that fits Owner2's request better than the category used to date.

Using the examples ("I Feel Fine", "I'm Down", "Helter Skelter", and "Twist and Shout") and counter-examples ("Across the Universe", "Blackbird", Eleanor Rigby", "Norwegian Wood", "You Know My Name" and "And I Love Her"), Agent2 finds that the distinctive feature set associated with the category it has used to date (Category4) is not the best feature set for distinguishing the examples from the counter-examples. In other words, Agent2 has misinterpreted Owner2's request.

Agent2 takes corrective action and introduces a new category, Category5, defined in terms of the distinctive feature Tempo(Fast), and binds Category5 to a new label "fofafa" with a default strength of 0.5. Thus, for Category5: (Category5<Tempo(Fast)>, "fofafa", 0.5).

Step 14: Agent2—Transmit

Agent2 transmits the label "fofafa" to Agent0, together with the list of examples and counter-examples.

Step 15: Agent0—Categorize

Agent0 tries to find a category that matches the set of examples and counter-examples. The category, Category0<Artist(TheBeatles)>, yields a score of 0.0, which is below the threshold of 0.5. The category Category3<Genre (Rock'nRoll)> yields a score of 0.58, which is above the threshold.

Step 16: Agent0—Bind Label

Agent0 binds the label "fofafa" to Category3: (Category3<Genre(Rock'nRoll)>,"fofafa",0.5).

In the present example, Query 3 ends after performance of above-described Step 16. In other words, after Agent2 has provided Agent0 with a new label ("fofafa") and examples, and Agent0 has bound the new label to one of its own categories.

However, depending upon the detailed implementation of the system, the interaction between Agent0 and Agent2 could be extended so that, in effect, a second search is performed but this time using label "fofafa". More generally, different implementations of the system could permit interactions between a client and server to be extended by a variable number of steps depending upon whether or not new labels and/or categories get created during the initial query-response or in later exchanges during processing of the same user query. Even in such extended transactions, the following primitive functions will nevertheless be used:

query(label): the client requests the server to perform a query using the specified label;

results(label,dataset): the server returns to the client the set of data ("dataset") which is the server's result for the query using the label sent by the client;

transmit(label, examples, counter-examples): the client sends the server a set of example and counter-examples to indicate how the label is being used; and serverupdate((label,{failure or success}): the client indicates a failure or success to the server in response to the user's evaluation of the results provided by the server.

The skilled person will readily understand how to produce extended queries using the above four primitives, so it is unnecessary to give further details here.

As a result of Query 3, the first and third information systems have changed. More particularly, the database and playlists of the second information system have changed. Also, the dictionaries of Agent0 and Agent2 have developed. Table 11 below shows Owner2's playlist following Query 3. Tables 12 and 13, respectively, show the dictionaries of Agent0 and Agent2 following Query 3.

TABLE 11

| Owner2's Label for Playlist | Songs in Playlist |
|---|---|
| party music | I'm Down |
| | Twist and Shout |
| | I Feel Fine |
| | Helter Skelter |

TABLE 12

(for Agent0)

| Category | Definition | Label | Strength (of the binding between the label and the category) |
|---|---|---|---|
| Category0 | Artist(TheBeatles) | fafafa | 0.6 |
| | | fifafa | 0.5 |
| Category3 | Genre(Rock'nRoll) | fefafa | 0.5 |
| | | fofafa | 0.5 |

TABLE 13

(for Agent2)

| Category | Definition | Label | Strength (of the binding between the label and the category) |
|---|---|---|---|
| Category4 | Artist(TheBeatles) | fifafa | 0.5 |
| Category5 | Tempo(Fast) | fofafa | 0.5 |

So far, the only alterations occurring in the datasets of the three information systems have arisen because of peer-to-peer exchanges. However, the owners of the different information systems can freely alter their own information systems (both in terms of what data is stored as well as the taxonomy used to describe it—e.g. the playlists can be changed).

It will be assumed that after Query 3 (but before Query 4) the owners of the first and third information systems make changes to their information systems. More particularly:

Owner0 creates a new playlist, called "elvis", that contains the following songs: "Love Me Tender", "Don't Be Cruel", and "Suspicious Minds".

Owner2 adds two new songs in her playlist "party music": "Billie Jean" and "Borderline".

Tables 14 and 15 show the playlists of Owner0 and Owner2, respectively, after these changes have been made.

TABLE 14

| Owner0's Label for Playlist | Songs in Playlist |
|---|---|
| Beatles | Across The Universe |
| | And I Love Her |
| | Blackbird |
| | Eleanor Rigby |
| | Helter Skelter |
| | I'm Down |
| | I Feel Fine |
| | Norwegian Wood |
| | Twist and Shout |
| | You Know My Name |
| Stones | Let's Spend the Night Together |
| | Ruby Tuesday |
| Elvis | Love Me Tender |
| | Don't Be Cruel |
| | Suspicious Minds |

TABLE 15

| Owner2's Label for Playlist | Songs in Playlist |
|---|---|
| party music | I'm Down |
| | Twist and Shout |
| | I Feel Fine |
| | Helter Skelter |
| | Borderline |
| | Billie Jean |

Query 4—an Example of Server Failure

In the fourth interaction, Owner asks Owner0 for more "party music". Owner2 selects the playlist "party music" and asks her agent (Agent2) to search for similar songs. Since Owner2 has only one playlist, once again there are no counter-examples for this request.

The set of songs used as examples are: "I'm Down", "Twist and Shout", "I Feel Fine", "Helter Skelter", "Borderline", and "Billie Jean".

The steps taken by the system to fulfill this request are, as follows:

Step 1: Agent2—Categorize

Agent2 tries to find a category that fits Owner2's selection. The category, Category5<Tempo(Fast)>, covers all the examples and yields a score of 1.0.

Step 2: Agent2—Code

As far as Agent2 is concerned, Category5 is bound to only one label, "fofafa", with a strength of 0.5.

Step 3: Agent2—Query

Agent2 transmits the label "fofafa" to Agent0 as a request for songs in the category described by "fofafa".

Step 4: Agent0—Decode

Agent0 decodes "fofafa" as Category3<Genre(Rock'nRoll)>.

Step 5: Agent0—Filter

Agent0 uses Category3 to filter its dataset. The resulting songs are: "I Feel Fine", "And I Love Her", "I'm Down", "Twist and Shout", "Love Me Tender", "Don't Be Cruel", and "Suspicious Minds".

Step 6: Agent0—Supply

Agent0 transmits to Agent0 the results obtained in Step 5 above.

Step 7: Agent2—Select

Agent2 asks Owner2 to evaluate the results received from the server. Owner2 selects the following results as positive: "I Feel Fine", "I'm Down", and "Twist and Shout". The other songs ("And I Love her", "Love Me Tender", "Don't Be Cruel", and "Suspicious Minds") are not selected as good results.

All of the positive search results correspond to songs that are already in Owner2's database, so no new songs are added. However, it is still worthwhile for Agent2 and Agent0 to continue to communicate with the aim of improving the alignment of their categories/labels.

Step 8: Agent2—Server Failure

The percentage of good results, as decided by Owner2, is 42%. This score is below the threshold of 50%, indicating a communication failure. Both Agent0 and Agent2 decrease the strength of the binding between "fofafa" and Category3 (Category5, respectively), by 0.1.

Agent2 tests whether it misunderstood Owner2's request or whether Agent0 decoded the query wrongly. Agent2 combines the two sets of good examples and the two sets of counter-examples. The list of all examples is "I Feel Fine", "I'm Down", "Twist and Shout", "Helter Skelter", "Borderline", and "Billie Jean". The list of all counter-examples is "And I Love Her", "Love Me Tender", "Don't Be Cruel", and "Suspicious Minds". Using all the available examples and counter-examples, Agent2 tests if there is any existing category, or a new category, that fits Owner2's request better than the category used to date. However, it finds that the category it has already been using (i.e. Category 5<Tempo(Fast)>) yields a score of 1.0. Agent2 concludes that it has not misinterpreted Owner2's request. Accordingly it considers that Agent0 has made a decoding error.

Step 9: Agent2—Transmit

Agent2 indicates to Agent0 what it meant by "fofafa" by transmitting to Agent0 the list of examples and counter-examples.

Step 10: Agent0—Categorize

Agent0 tries to find an existing category that matches the set of examples and counter-examples received from Agent2. The category Category0<Artist(TheBeatles)> yields a score of 0.42, and the category Category3<Genre(Rock'nRoll)> yields a score of 0.0, both of which are below the threshold of 0.5.

Step 11: Agent0—Create Category

Agent0 creates a new category which discriminates the examples from the counter-examples to a sufficient extent. This new category is Category6<Tempo(Fast)>. Agent0 binds the label "fofafa" to Category6 with the default strength 0.5.

At the end of the fourth query, the dictionaries of the first and third information systems have changed again. Tables 16 and 17, respectively, show the dictionaries of Agent0 and Agent2 following Query 4.

TABLE 16

(for Agent0)

| Category | Definition | Label | Strength (of the binding between the label and the category) |
|---|---|---|---|
| Category0 | Artist(TheBeatles) | fafafa | 0.6 |
|  |  | fifafa | 0.5 |
| Category3 | Genre(Rock'nRoll) | fefafa | 0.5 |
|  |  | fofafa | 0.4 |
| Category6 | Tempo(Fast) | fofafa | 0.5 |

TABLE 17

(for Agent2)

| Category | Definition | Label | Strength (of the binding between the label and the category) |
|---|---|---|---|
| Category4 | Artist(TheBeatles) | fifafa | 0.5 |
| Category5 | Tempo(Fast) | fofafa | 0.4 |

At the end of the above-described series of four queries, the three information systems are starting to build up their own lexicons for use in exchanges with the others. However, at this early stage communication between the agents is hampered by the existence of homonyms (e.g. "fofafa" used for two different categories: Genre(Rock'nRoll) and Tempo(Fast)) and synonyms (e.g. "fefafa" and "fofafa" for Genre(Rock'nRoll)). As the number of interactions between these information systems increases, the labels and the semantics of the categories will tend to become aligned.

EXAMPLE APPLICATION 2

Exchange of Documents

There is a growing number of documents available on the World Wide Web. For example, in the scientific domain most authors now have their own websites on which they post their papers in ps (postscript) or pdf (Adobe Acrobat) formats. These constitute the data that is being exchanged. Also, sites dedicated to a particular subject matter have publications of individual authors. Scientific journals have their own websites which are usually only accessible through subscription (but university libraries now often take university-wide subscriptions). There is also a growing number of e-journals which are only available through the web. Moreover, there are several sites (such as Citeseer, http://citeseer.ist.psu.edu/) which are tracking publications of authors.

This kind of application domain is typical for the technologies discussed in the present document. There is an open-ended set of data (the documents themselves) and there is meta-data but it is usually in a form that is specific to a site. For example, journal or citation sites have at least author, publication date, keywords, abstract, etc. Author or subject sites usually feature additional organization imposed on the data or provide additional keywords, but these organizations are very different from one site to another (for example different publishers have different organizations and meta-data for each of their collections). Sites often store their own copies of papers, possibly in different forms than the source, particularly because the source sites may be volatile and papers could disappear. This way users can become a server for others. For example, Citeseer caches its own version of papers in different formats and provides information on the path through which it obtained data (which is often not the site where the paper was originally stored).

When applying an embodiment of the present invention in this domain, each of these sites can be viewed as a peer in a peer-to-peer network and an Interlingua would form among the information agents that are attached to each site. It is not expected that there would be a global, universal Interlingua, but that in specific fields of science (eg. machine vision, nano-electronics, etc.) specific sub-interlinguas would emerge among the agents. These interlinguas would become adapted to the actual needs of the users that are exchanging data and to the semantic structure of the domain.

Note that it is crucial that each user has some organization on the data or sufficient meta-data to support the construction of categories. The specific implementation as to how the categorizer accesses these meta-data is local to each peer. Meta-data that peers can use can be obtained using many standard techniques from information retrieval.

EXAMPLE APPLICATION 3

Sharing Product Information

The sharing of information is not limited to web contents but can be extended to other fields, for example to the general case of product information. The adoption by industry of the RFID standard (Radio Frequency Identification) will allow consumers and companies to obtain information about any product. RFID's are small electronic labels that emit a digital signal that can be read by appropriate readers. The Electronic Product Code (EPC) supplements the RFID standard with a naming convention that provides every product with a unique identification, similar to the Domain Name System for resolving Internet domain names. Auto-ID extends this further by providing a database that translates the EPC into a machine-readable description of the physical properties of the product using the Physical Markup Language (PML) ("PML Core Specification 1.0", Christian Floerkemeier, Dipan Anarkat, Ted Osinski, Mark Harrison, Auto-ID Center, University of St. Gallen, Institute of Technology Management, http://www.autoidlabs.org.uk/whitepapers/STG-AUTOID-WH005.pdf). The Auto-ID projects limit the meta-data to the physical properties of a product. However, it can be expected that more meta-data on products will become available over time, such as the ingredients of food, or the safety rating of electronic products.

People daily handle or browse lists of products. Consumers organize products into shopping lists; magazines make a weekly selection of interesting new objects; chefs publish recipes with a list of ingredients; retailers publish their catalogues; consumer organizations sort products according to their ratings. As both products and consumers become equipped with electronic devices, the exchange of product information between people in an ad-hoc, distributed environment such as shopping malls becomes a major application of the present invention, as it allows the interoperability between these information systems.

Using the present invention, new applications can be introduced. For example, a shopper selects a number of products and asks the other customers for a list of similar items. An interlingua could gradually arise between users having similar interests and active in sharing information. Again, one global, universal interlingua may not develop, but many local languages may arise adapted to the needs, interests, and meta-data available in a particular community Although the present invention has been discussed above in terms of detailed features of preferred embodiments thereof, the skilled person will readily understand that the invention is not limited with regard to the particularities of the above-described embodiments. More especially, various modifications and adaptations may be made in the above-described preferred embodiments without departing from the scope of the invention as defined in the accompanying claims.

For example, in the above-described query-response transactions between peers, the server sends to the client all of the data that is considered to match the clients' request. However, it could be envisaged to transmit back only one data item, or more generally a number of data items less than the full set of data which the server considers to match the client's enquiry.

Furthermore, in the above-described example application it was indicated that when a client's owner receives a response to a query the owner indicates which results (if any) are relevant and can choose whether or not to add the selected items to his information system. In practice, it is often more congenial for the owner if the selected results are added automatically to his information system without any further action on her part.

Additionally, it should be commented that although the preferred embodiments of the invention have been discussed in terms of one-to-one exchanges between two information systems (one acting as client and the other acting as server), in practice a client may well emit a message onto the peer-to-peer network in such a manner that it has no particular addressee. In other words, the present invention covers the case where the client emits a query to substantially all members of the network (or to a predefined subset, such as a trusted community of peers). The client (and/or control elements in the network) will apply well-known algorithms for deciding which peer (or peers) to treat as the server for subsequent processing of this query. Evidently, the invention also covers the case where a first information system makes a query to a specified server.

Moreover, the techniques described above for promoting semantic interoperability in information exchange between information systems in a peer-to-peer network have dealt with the case where the owner of one information system makes a request for data from other information systems (a query). However, these techniques are readily adaptable to other cases, for example the case where one information system owner wishes to make an announcement to others with regard to the data she has in her own information system (e.g. an offer).

In an information exchange involving an "announcement" of available data, the owner of an information system receiving the announcement may respond to the announcement by requesting to be sent data from the information system making the announcement. In this case, it is be the owner of the information system which receives the announcement who may request data and, eventually, make a selection from among results provided by the information system which made the announcement. Thus, it can be considered that the "announcer" is the server and the information system receiving the announcement is the client. In "announcement" transactions between peers, the same type of coding, decoding, categorization and filtering functions are used as those described above.

Although, in the above-described preferred embodiments, a query including a label is initially issued by a client to a server, and examples of the category designated by the label may be transmitted later on, it is also possible to include example and/or counter-example data with the label in the initial query transmission (although this is less efficient if the client and server both understand the label used).

The invention claimed is:

1. An information system comprising:
an accessing unit adapted to access a first collection of data items;

a retrieval-request unit adapted to enable a user of said information system to identify a class of data items said user desires to retrieve from a remote information system, wherein the user identifies said class of data items by reference to a set of one or more examples, said examples being data items in said first collection;

an information agent responsive to the retrieval-request unit and adapted to prepare an initial query for transmitting the user's request to a remote information system, said information agent comprising a classifier adapted automatically to determine a data-item-category applicable to said set of examples identified by the user;

a coder adapted to select a label from among a set of one or more labels associated with the data-item-category determined by the classifier, the information agent is adapted to designate the category of data item desired for retrieval by including in the initial query the label selected by the coder;

an output unit adapted to output the initial query prepared by the information agent as a query;

an input unit adapted to receive information identifying data items retrieved by a remote information system in response to the query output by said output unit;

a presentation unit adapted to present the user with said information identifying the data items retrieved by the remote information system; and a selection unit to enable the first user to make a selection from among the data items retrieved from the remote information system in response to a query;

wherein the information agent maintains an inventory of categories, labels, and bindings associating labels and categories with each other, and the coder is adapted to select, from among the set of one or more labels associated with the data-item-category determined by the classifier, the label which the inventory indicates has the strongest binding to said determined data-item-category; and the information agent is responsive to the selection unit to increase the strength of the binding, between the label included in the initial query and the data-item-category determined by the classifier, relative to the strength of the binding between said determined data-item category and other labels of said set of labels associated with said determined data-item-category, when the user's selection indicates that data retrieved by said remote information system in response to the initial query of the user conforming to the user's initial query, and to reduce the strength of the binding, between the label included in the initial query and the data-item-category determined by the classifier, relative to the strength of the binding between said determined data-item category and other labels of said set of labels associated with said determined data-item-category, when the selection of the user indicates that data retrieved by the remote information system in response to the initial query of the user does not conform to the user's initial query.

2. The information system of claim 1, comprising:
a structuring unit to enable the user to define a data structure applicable to data items of said first collection, the nodes of said data structure being labeled according to a user taxonomy;
wherein the retrieval-request unit is further adapted to enable a user of said information system to identify, by reference to the user taxonomy, the class of data item desired for retrieval.

3. The information system of claim 1, wherein each of the categories in the list maintained by the information agent is defined in terms of a distinctive feature set and the classifier is adapted to determine the category to which the user-identified set of data items should be assigned by comparing the features of the user-identified set of examples with the distinctive feature sets of the categories in the list maintained by the information agent.

4. The information system of claim 1, further comprising:
a feedback unit responsive to the selection unit whereby to cause a signal identifying the user's selection to be output to the remote information system.

5. The information system of claim 1, wherein the information agent is adapted to cause the output, to the remote information system, of data identifying the user-identified set of examples, in the case where the information received from the remote information system indicates that no data items have been retrieved by said remote information system in response to a query, or in the case where the user operates the selection unit to select a quantity of retrieved data items lower than a predetermined threshold.

6. The information system of claim 1, wherein the information agent is adapted:
to determine whether the quantity of data items selected by the user from among the retrieved data items is greater or lower than a predetermined threshold;
if the selected quantity is below the threshold, to cause the classifier to determine a revised category applicable to the aggregate of the examples identified to the retrieval-request unit and the data items selected by the user from among the data items retrieved by the remote information system; and
if the revised category is different from the assigned category that was labeled in the initial query, to prepare and output to the remote information system a complement to the initial query, said complement including a revised label being the label having the strongest binding to the revised category.

7. A peer-to-peer information-exchange system comprising a plurality of peer information systems that are connected to each other via a network, operable in client mode or a server mode, each peer information system operating in a client mode being an information system comprising:
an accessing unit adapted to access a collection of data items;
a retrieval-request unit adapted to enable a user of said information system operating in a client mode to identify a class of data items said user desires to retrieve from a remote information system, where the user identifies said class of data items by reference to a set of one or more examples, said examples being data items in said first collection;
an information agent responsive to the retrieval-request unit and adapted to prepare an initial query for transmitting the user's request to a remote information system operating in a server mode, said information agent comprising a classifier adapted automatically to determine a data-item-category applicable to said set of examples identified by the user, and a coder adapted to select a label from among a set of one or more labels associated with the data-item-category determined by the classifier, wherein the information agent is adapted to designate the category of data item desired for retrieval by including in the initial query the label selected by the coder;
an output unit adapted to output the initial query prepared by the information agent;
an input unit adapted to receive information identifying data items retrieved by a remote information system in response to a query output by said output unit;

a presentation unit adapted to present the first user with said information identifying the data items retrieved by the remote information system; and a selector for enabling the first user to make a selection from among the data items retrieved from the remote information system in response to a query;

wherein the information agent maintains an inventory of categories, labels and bindings associating labels and categories with each other, and the coder is adapted to select, from among the set of one or more labels associated with the data-item-category determined by the classifier, the label which the inventory indicates has the strongest binding to said determined data-item-category; and the information agent is responsive to the selector, to increase the strength of the binding, between the label included in the initial query and the data-item-category determined by the classifier, relative to the strength of the binding between said determined data-item category and other labels of said set of labels associated with said determined data-item-category, when the selection of the user indicates that data retrieved by said remote information system in response to the initial query of the user conforms to the user's initial query, and to reduce the strength of the binding, between the label included in the initial query and the data-item-category determined by the classifier, relative to the strength of the binding between said determined data-item category and other labels of said set of labels associated with said determined data-item-category, when the selection of the user indicates that data retrieved by the remote information system in response to the initial query of the user does not conform to the user's initial query; and each peer information system operating in a server mode being an information system comprising an accessing unit adapted to access a collection of data items;

an input unit adapted to receive an initial query from a remote information system operating in a client mode, said query requesting retrieval of a data item by said accessing unit of the information system operating in a server mode, and said initial query including a label;

an information agent comprising a decoder adapted to process the received initial query whereby to determine a set of one or more data-item-categories associated with said label, and to select from among the data-item categories of said set an initial category of data item for retrieval by the accessing unit of the information system operating in a server mode, said information agent being adapted to prepare an initial response identifying the data items in said collection belonging to said determined initial category; and an output unit adapted to output said initial response to the remote information system;

wherein the information agent of said information system operating in a server mode is adapted to maintain an inventory of categories, labels and bindings associating labels and categories with each other, and the decoder of the information system operating in a server mode is adapted to determine the initial category of data items for retrieval, by selecting, from among said set of one or more data-item categories associated with the label received in the initial query, the category that the inventory indicates has the strongest binding to the label received in the initial query, and the information agent of the information system operating in a server mode is responsive to feedback received from the remote information system whereby to change the strength of a selection, made by a user of said remote information system from among the data items identified in said initial response, the information agent increasing the strength of the binding between the label included in the initial query and the data-item-category selected by the decoder, relative to the strength of the binding between said label and other data-item-categories in said set, when the feedback received from the remote information system indicates that data in said initial response conforms to the user's initial query and the information agent reducing the strength of the binding between the label included in the initial query and the data-item-category selected by the decoder, relative to the strength of the binding between said label and other data-item-categories in said set, when the feedback received from the remote information system indicates that data in said initial response does not conform to the user's initial query.

8. An information system comprising:

an accessing unit adapted to access a first collection of data items;

a specifying unit adapted to enable a user of said information system to identify a class of data items said user desires to identify to a remote information system, wherein the user identifies said class of data items by reference to a set of one or more examples, said examples being data items in said first collection;

an information agent responsive to the specifying unit and adapted to prepare an initial message for transmission to a remote information system, said information agent comprising a classifier adapted automatically to determine a data-item-category applicable to said set of examples identified by the user;

a coder adapted to select a label from among a set of one or more labels associated with the data-item category determined by the classifier, wherein the information agent is adapted to designate the category of data item desired for retrieval by including in the initial message the label selected by the coder;

an output unit adapted to output the initial message prepared by the information agent; and an input unit adapted to receive from a remote information system a request for identification of data items, in said first data collection, in the data-item-category indicated by the label included in the initial message;

wherein the information agent is adapted to identify said set of examples to said remote information system;

the information agent is adapted to maintain an inventory of categories, labels, and bindings associating labels and categories with each other, and the coder is adapted to select, from among the set of one or more labels associated with the data-item-category determined by the classifier, the label which the inventory indicates has the strongest binding to the assigned category; and the information agent is responsive to feedback received from the remote information system whereby to change the strength of bindings between labels and categories, said feedback being indicative of a selection, made by a user of said remote information system, from among said set of data items, the information agent is responsive to the selection to increase the strength of the binding, between the label included in the initial message and the data-item-category determined by the classifier, relative to the strength of the binding between said determined data-item category and other labels of said set of labels associated with said determined data-item-category, when the user's selection indicates that data retrieved by said remote information system in response to the initial message of the user conforming to the user's initial message, and to reduce the strength of the binding, between the label included in the initial query and the data-item-category determined by the classifier, relative to the strength of the binding between said determined data-item category and other labels of said set of labels associated with said determined data-item-category, when the selection of the user indicates that data retrieved by the remote information system in response to the initial message of the user does not conform to the user's initial message.

9. A method of managing information exchange in a peer-to-peer network comprising a plurality of peer information systems operable in a client mode or a server mode, each peer information system including at least one hardware computer and including a collection of data items, an input unit for a user to indicate a class of data items desired for retrieval from a remote peer, and to make a selection from among data items retrieved by a remote peer, the method comprising the steps of:

providing each peer information system with an information agent maintaining an inventory of labels, categories, and bindings associating the labels and categories with each other;

enabling a user of said peer information system operating in the client mode to identify a class of data items that said user desires to retrieve from the remote peer, the user identifies said class of data items by reference to a set of one or more examples, said examples being data items in a first collection;

preparing an initial query for transmitting the user's request from the peer information system operating the client mode to the remote peer, said information agent comprising a classifier adapted automatically to determine a data-item-category applicable to said set of examples identified by the user;

selecting from among a set of one or more labels associated with the client-side category the label which the inventory indicates has the strongest binding to said determined client-side category and includes the selected label in the initial query output to the remote peer, when preparing said initial query;

decoding by the information agent the label received in the initial query, when responding to a query in server mode, determining a set of one or more data-item-categories associated with said label and selecting, as the category of data item for retrieval, the server-side category that the inventory indicates has the strongest binding to the received label, when responding to a query in server mode;

changing by the information agent the strength of the bindings between the labels and categories of its inventory dependent upon users' selections among data items retrieved from remote peers;

increasing by the information agent the binding between said determined client-side category and the selected label included in the initial query output to the remote peer, relative to the strength of the binding between said determined client-side category and other labels associated with said determined client-side category in the inventory, when user selections indicate that the response produced by the remote peer conforms to the query formulated in client mode;

reducing the binding between said determined client-side category and the selected label included in the initial query output to the remote peer, relative to the strength of the binding between said determined client-side category and other labels associated with said determined client-side category in the inventory, when user selections indicate that the response produced by the remote peer does not conform to the query formulated in client mode; increasing the binding between said determined server-side category and the label included in the query received from the remote peer, relative to the strength of the binding between said label and other server-side data-item categories associated with said label in the inventory, when user selections indicate that the response generated in server mode conforms to the received query; and reducing the binding between said determined server-side category and the label included in the query received from the remote peer, relative to the strength of the binding between said label and other server-side data-item categories associated with said label in the inventory, when user selections indicate that the response generated in server mode does not conform to the received query.

* * * * *